(12) United States Patent
Guan et al.

(10) Patent No.: US 11,723,022 B2
(45) Date of Patent: Aug. 8, 2023

(54) COMMUNICATION METHOD AND COMMUNICATIONS DEVICE

(71) Applicant: HUAWEI TECHNOLOGIES CO., LTD., Guangdong (CN)

(72) Inventors: Peng Guan, Chengdu (CN); Xiaoyong Tang, Shenzhen (CN); Enzhi Zhou, Chengdu (CN); You Li, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 21 days.

(21) Appl. No.: 16/786,477

(22) Filed: Feb. 10, 2020

(65) Prior Publication Data

US 2020/0178280 A1 Jun. 4, 2020

Related U.S. Application Data

(63) Continuation of application No. PCT/CN2018/098345, filed on Aug. 2, 2018.

(30) Foreign Application Priority Data

Aug. 11, 2017 (CN) .......................... 201710687477.5

(51) Int. Cl.
*H04W 72/1273* (2023.01)
*H04B 7/01* (2006.01)
(Continued)

(52) U.S. Cl.
CPC .......... *H04W 72/1273* (2013.01); *H04B 7/01* (2013.01); *H04B 7/0617* (2013.01);
(Continued)

(58) Field of Classification Search
CPC ............ H04W 72/1273; H04W 24/10; H04W 72/046; H04W 72/085; H04B 7/01;
(Continued)

(56) References Cited

U.S. PATENT DOCUMENTS

2013/0215835 A1\* 8/2013 Chen ...................... H04L 5/0035
370/329
2013/0279437 A1\* 10/2013 Ng ....................... H04L 25/0224
370/329
(Continued)

FOREIGN PATENT DOCUMENTS

| CN | 101965047 A | 2/2011 |
|---|---|---|
| CN | 104247291 A | 12/2014 |

(Continued)

OTHER PUBLICATIONS

3GPP TS 36.211 V1.2.0: "3rd Generation Partnership Project; Technical Specification Group Radio Access Network Physical Channels and Modulation(Release 8)",Jun. 2007, 43 pages.
(Continued)

*Primary Examiner* — Ajit Patel
*Assistant Examiner* — Wilfred Thomas
(74) *Attorney, Agent, or Firm* — Fish & Richardson P.C.

(57) ABSTRACT

This application discloses a communication method and a communications device. The communication method includes: receiving configuration information sent by a base station, where the configuration information includes information about a first signal and quasi-co-location relationship information, and the quasi-co-location relationship information indicates that there is a quasi-co-location relationship between a port for sending the first signal and a port for sending a second signal; and obtaining a measurement quantity of the first signal based on a measurement quantity of the second signal and the quasi-co-location relationship information. According to the method, a quasi-co-location relationship is obtained and a measurement quantity is obtained based on the quasi-co-location relationship.

15 Claims, 12 Drawing Sheets

| | Port assumed to be in a QCL relationship |
|---|---|
| QCL type 1 | {SS port}; {CSI-RS resource 1 to CSI-RS resource 4} |
| QCL type 2 | Omitted |
| QCL type 3 | Beam indication information |

(51) Int. Cl.
*H04B 7/06* (2006.01)
*H04L 5/00* (2006.01)
*H04L 5/10* (2006.01)
*H04W 24/10* (2009.01)

(52) U.S. Cl.
CPC ......... *H04B 7/0626* (2013.01); *H04L 5/0051* (2013.01); *H04L 5/10* (2013.01); *H04W 24/10* (2013.01)

(58) Field of Classification Search
CPC .... H04B 7/0617; H04B 7/0626; H04B 7/086; H04B 7/0695; H04B 7/088; H04L 5/0051; H04L 5/10; H04L 5/0048; H04L 5/0094; H04L 5/006
See application file for complete search history.

(56) References Cited

U.S. PATENT DOCUMENTS

| | | | |
|---|---|---|---|
| 2014/0036804 A1 | 2/2014 | Chen et al. | |
| 2015/0103800 A1* | 4/2015 | Seo | H04W 48/16 370/330 |
| 2015/0201369 A1 | 7/2015 | Ng et al. | |
| 2015/0236801 A1* | 8/2015 | Sun | H04L 27/2613 370/328 |
| 2015/0365154 A1 | 12/2015 | Davydov et al. | |
| 2018/0205437 A1* | 7/2018 | Kim | H04B 7/0456 |
| 2019/0157770 A1* | 5/2019 | Park | H04W 72/0446 |
| 2019/0173562 A1* | 6/2019 | Yu | H04W 72/042 |
| 2019/0261349 A1 | 8/2019 | Ren et al. | |
| 2019/0306847 A1* | 10/2019 | Seo | H04L 27/2676 |
| 2020/0053738 A1* | 2/2020 | Harada | H04L 5/0057 |
| 2020/0137598 A1* | 4/2020 | Zhang | H04W 72/1273 |
| 2020/0205082 A1* | 6/2020 | Chen | H04W 52/325 |
| 2020/0304256 A1* | 9/2020 | Park | H04W 72/042 |
| 2020/0305130 A1* | 9/2020 | Kang | H04L 5/0051 |
| 2020/0336193 A1* | 10/2020 | Park | H04B 7/0408 |
| 2021/0136639 A1* | 5/2021 | Osawa | H04W 24/10 |

FOREIGN PATENT DOCUMENTS

| | | |
|---|---|---|
| CN | 104982063 A | 10/2015 |
| CN | 105991267 A | 10/2016 |
| CN | 108023631 A | 5/2018 |

OTHER PUBLICATIONS

3GPP TS 36.212 V1.3.0: '3rd Generation Partnership Project;Technical Specification Group Radio Access Network; Multiplexing and channel coding(Release 8)', Jul. 2007, 20 pages.

3GPP TS 36.213 V1.2.0: "3rd Generation Partnership Project; Technical Specification Group Radio Access Network; Physical layer procedures(Release 8)", May 2007, 10 pages.

3GPP TS 36.331 V14.3.0: 3rd Generation Partnership Project, Technical Specification Group Radio Access Network, Evolved Universal Terrestrial Radio Access (E-UTRA), Radio Resource Control (RRC),Protocol specification(Release 14), Jun. 2017, 186 pages.

PCT International Search Report and Written Opinion in International Application No. PCT/CN2018/098,345, dated Oct. 11, 2018, 21 pages (With English Translation).

Extended European Search Report and Written Opinion issued in European Application No. 18843407.0 dated May 8, 2020, 13 pages.

Qualcomm Incorporated, "Discussion on QCL," 3GPP TSG HAN WG1 NR Ad-Hoc#2, R1-1711176; Qingdao, China, Jun. 27-30, 2017, 4 pages.

Nokia, "Summary of QCL," 3GPP TSG RAN WG1 NR Ad-Hoc#2 , R1-1711672, Qingdao, China, Jun. 27-30, 2017, 11 pages.

Office Action issued in Chinese Application No. 201710687477.5 dated Jul. 20, 2022, 8 pages.

* cited by examiner

|  | Port assumed to be in a QCL relationship |
|---|---|
| QCL type 1 | {SS port}; {CSI-RS resource 1 to CSI-RS resource 4} |
| QCL type 2 | Omitted |
| QCL type 3 | Beam indication information |

FIG. 3(a)

|  | Port assumed to be in a QCL relationship |
|---|---|
| QCL type 1 | {SS port}; {CSI-RS resource 1 to CSI-RS resource 4} |
| QCL type 2 | Omitted |
| QCL type 3 | {SS port}; {CRI resource, SRS resource} and beam indication information |

FIG. 3(b)

|  | Port assumed to be in a QCL relationship |
|---|---|
| QCL type 1 | CSI-RS resource 1; SRS resource 1 |
| QCL type 2 | Omitted |
| QCL type 3 | Beam indication information |

FIG. 3(c)

| LOI | Info. on gNB Tx parameters | Info. on UE Rx parameters |
|---|---|---|
| [00] | CRI #0 | Rx parameter #0 |

FIG. 4(a)

| LOI | Info. on gNB Tx parameters |
|---|---|
| [00] | CRI #0 |
| [01] | CRI #2 |
| [10] | CRI #3 |
| [11] | CRI #4 |

FIG. 4(b)

| LOI | Info. on gNB Tx parameters | Info. on UE Rx parameters |
|---|---|---|
| [00] | CRI #0 | Rx parameter #0 |
| [01] | CRI #2 | Rx parameter #1 |
| [10] | CRI #3 | Rx parameter #2 |
| [11] | CRI #4 | Rx parameter #3 |

FIG. 4(c)

| UL-LOI | Info. on gNB Rx parameters | Info. on UE Tx parameters |
|---|---|---|
| [00] | SRI #0 | Tx parameter #0 |

FIG. 5(a)

| UL-LOI | Info. on gNB Rx parameters |
|---|---|
| [00] | SRI #0 |
| [01] | SRI #2 |
| [10] | SRI #3 |
| [11] | SRI #4 |

FIG. 5(b)

| UL-LOI | Info. on gNB Rx parameters | Info. on UE Tx parameters |
|---|---|---|
| [00] | SRI #0 | Tx parameter #0 |
| [01] | SRI #2 | Tx parameter #1 |
| [10] | SRI #3 | Tx parameter #2 |
| [11] | SRI #4 | Tx parameter #3 |

| LOI | Info. on gNB Tx parameters | Info. on UE Rx parameter(s) | Info. on gNB Rx parameters | Info. on UE Tx parameter(s) |
|---|---|---|---|---|
| [00] | CRI and/or port ID | Rx parameter(s) | SRI | Tx parameter(s) |
| ... | ... | ... | ... | ... |
| [10] | CRI and/or port ID | Rx parameter(s) | SRI | Tx parameter(s) |
| ... | ... | ... | ... | ... |

| | Port assumed to be in a QCL relationship |
|---|---|
| QCL type 1 | Group 1: {SS port}; {DMRS port group 1}; {CSI-RS resource 1 to CSI-RS resource 4} |
| | Group 2: {SS port}; {DMRS port group 2}; {CSI-RS resource 5 to CSI-RS resource 8} |
| QCL type 2 | Group 1-1: {DMRS port group 1-1}; {CSI-RS resource 1 and CSI-RS resource 2} |
| | Group 1-2: {DMRS port group 1-2}; {CSI-RS resource 3 and CSI-RS resource 4} |
| | Group 2-1: {DMRS port group 2-1}; {CSI-RS resource 5 and CSI-RS resource 6} |
| | Group 2-2: {DMRS port group 2-2}; {CSI-RS resource 7 and CSI-RS resource 8} |
| QCL type 3 | Beam indication information |

FIG. 8(a)

|  | Port assumed to be in a QCL relationship |
|---|---|
| QCL type 1 | Group 1: {SS port}; {DMRS port group 1}; {CSI-RS resource 1 to CSI-RS resource 4}<br>Group 2: {SS port}; {DMRS port group 2}; {CSI-RS resource 5 to CSI-RS resource 8} |
| QCL type 2 | Group 1-1: {DMRS port group 1-1}; {CSI-RS resource 1 and CSI-RS resource 2}<br>Group 1-2: {DMRS port group 1-2}; {CSI-RS resource 3 and CSI-RS resource 4}<br>Group 2-1: {DMRS port group 2-1}; {CSI-RS resource 5 and CSI-RS resource 6}<br>Group 2-2: {DMRS port group 2-2}; {CSI-RS resource 7 and CSI-RS resource 8} |
| QCL type 3 | {SS port}; {CRI resource, SRS resource} and beam indication information |

FIG. 8(b)

|  | Port assumed to be in a QCL relationship |
|---|---|
| QCL type 1 | Group 1: {D1–D4}; {CRI 1, CRI 2, CRI 3, CRI 4}<br>Group 2: {D5–D8}; {CRI 5, CRI 6, CRI 7, CRI 8} |
| QCL type 2 | Group 1-1: {D1–D2}; {CRI 1, CRI 2}<br>Group 1-2: {D3–D4}; {CRI 3, CRI 4}<br>Group 2-1: {D5–D6}; {CRI 5, CRI 6}<br>Group 2-2: {D7–D8}; {CRI 7, CRI 8} |
| QCL type 3 | Beam indication information |

FIG. 9(a)

|  | Port assumed to be in a QCL relationship |
|---|---|
| PDSCH DMRS port | D1, D5 |
| PDCCH DMRS port | D1 |
| PDCCH beam direction | BPL 1 |
| PDSCH beam direction | BPL 1 |
| CSI-RS configuration | CRI 1, CRI 2, CRI 5 |

FIG. 9(b)

|  | Port assumed to be in a QCL relationship |
|---|---|
| QCL type 1 | Group 1: {SS port}; {DMRS port group 1}; {CSI-RS resource 1 to CSI-RS resource 4} <br> Group 2: {SS port}; {DMRS port group 2}; {CSI-RS resource 5 to CSI-RS resource 8} |
| QCL type 2 | Group 1-1: {DMRS port group 1-1}; {CSI-RS resource 3 and CSI-RS resource 4} <br> Group 1-2: {DMRS port group 1-2}; {CSI-RS resource 1 and CSI-RS resource 2} <br> Group 2-1: {DMRS port group 2-1}; {CSI-RS resource 7 and CSI-RS resource 8} <br> Group 2-2: {DMRS port group 2-2}; {CSI-RS resource 5 and CSI-RS resource 6} |
| QCL type 3 | Beam indication information |

FIG. 12(a)

|  | Port assumed to be in a QCL relationship |
|---|---|
| QCL type 1 | Group 1: {SS port}; {DMRS port group 1}; {CSI-RS resource 1 to CSI-RS resource 4} <br> Group 2: {SS port}; {DMRS port group 2}; {CSI-RS resource 5 to CSI-RS resource 8} |
| QCL type 2 | Group 1-1: {DMRS port group 1-1}; {CSI-RS resource 3 and CSI-RS resource 4} <br> Group 1-2: {DMRS port group 1-2}; {CSI-RS resource 1 and CSI-RS resource 2} <br> Group 2-1: {DMRS port group 2-1}; {CSI-RS resource 7 and CSI-RS resource 8} <br> Group 2-2: {DMRS port group 2-2}; {CSI-RS resource 5 and CSI-RS resource 6} |
| QCL type 3 | {SS port}; {CRI resource, SRS resource} and beam indication information |

FIG. 12(b)

COMMUNICATION METHOD AND COMMUNICATIONS DEVICE

CROSS-REFERENCE TO RELATED APPLICATIONS

This application is a continuation of International Application No. PCT/CN2018/098345, filed on Aug. 2, 2018, which claims priority to Chinese Patent Application No. 201710687477.5, filed on Aug. 11, 2017. The disclosures of the aforementioned applications are hereby incorporated by reference in their entireties.

TECHNICAL FIELD

This application relates to the field of communications technologies, and in particular, to a communication method and a communications device in a wireless communications system.

BACKGROUND

In a mobile communications system, transmission is performed by using a beam, to be specific, a signal is sent towards a particular direction in space, so that a higher antenna array gain can be implemented. The beam may be implemented by a technical means such as beamforming (Beamforming). For example, an important direction in high frequency (HF) communication is hybrid beamforming (hybrid beamforming) that combines analog beamforming and digital beamforming. In this way, a loss caused to a high frequency signal due to a transmission distance can be well combated, and complexity and hardware costs can also be controlled within an acceptable range.

During communication using a beam, especially when there is a probability of a plurality of beam directions, a base station usually indicates a receive beam to a terminal device in a beam indication manner. For example, the base station notifies the terminal device that there is a quasi-co-location relationship between a port of a demodulation reference signal for a data channel (or a control channel) and a port, within a resource configuration, of a channel state information reference signal; and after receiving this indication, the terminal device may choose to receive the data channel or the control channel in a receive beam direction in which the channel state information reference signal is previously received.

In new radio (NR), there is not yet a specific solution as to how the base station configures the quasi-co-location relationship based on new features of NR and indicates the quasi-co-location relationship to the terminal device.

SUMMARY

Embodiments of this application provide a communication method, a device, and a related product, to configure and obtain a quasi-co-location relationship.

According to a first aspect, an embodiment of this application provides a communication method. The method includes:

receiving configuration information sent by a base station, where the configuration information includes information about a first signal and quasi-co-location relationship information, and the quasi-co-location relationship information indicates that there is a quasi-co-location relationship between a port for sending the first signal and a port for sending a second signal; and obtaining a measurement quantity of the first signal based on a measurement quantity of the second signal and the quasi-co-location relationship information.

In the foregoing method, by receiving the configuration information that is related to the quasi-co-location relationship and that is sent by the base station and obtaining the measurement quantity of the first signal based on the measurement quantity of the second signal and the quasi-co-location relationship information, a quasi-co-location relationship can be obtained and a measurement quantity can be obtained based on the quasi-co-location relationship.

In a possible design, the measurement quantity of the first signal or the measurement quantity of the second signal includes at least one of the following information: a spatial parameter, an average gain, delay spread, Doppler spread, Doppler frequency shift, or an average delay.

In a possible design, the information about the first signal includes measurement information and beam information;

the measurement information includes the first signal, where the first signal is any one of a channel state information reference signal (CSI-RS), a control channel demodulation reference signal (DMRS), a data channel DMRS signal, a synchronization resource block, or a phase tracking reference signal (PTRS); and the beam information is information about a beam for receiving the first signal.

Optionally, the measurement information may further include content needing to be measured and a measurement manner.

In a possible design, it is determined, based on the beam information, that a spatial quasi-co-location relationship exists between the port for sending the first signal and the port for sending the second signal.

In a possible design, the quasi-co-location relationship information includes information about a quasi-co-location relationship that is with respect to an average gain and that is between the port for sending the first signal and the port for sending the second signal; and the obtaining a measurement quantity of the first signal based on a measurement quantity of the second signal and the quasi-co-location relationship information includes:

obtaining an average gain of the first signal based on an average gain of the second signal and the quasi-co-location relationship that is with respect to an average gain and that is between the port for sending the first signal and the port for sending the second signal.

Optionally, the first signal is a CSI-RS signal, and the second signal is a synchronization signal block. The obtaining a measurement quantity of the first signal based on a measurement quantity of the second signal and the quasi-co-location relationship information includes:

obtaining an average gain of the CSI-RS signal based on an average gain of the synchronization signal block and a quasi-co-location relationship that is with respect to an average gain and that is between a port for sending the CSI-RS signal and a port for sending the synchronization signal block.

Optionally, the first signal is a control channel DMRS signal, and the second signal is a CSI-RS signal. The obtaining a measurement quantity of the first signal based on a measurement quantity of the second signal and the quasi-co-location relationship information includes:

obtaining an average gain of the control channel DMRS signal based on an average gain of the CSI-RS signal and a quasi-co-location relationship that is with respect to an average gain and that is between a port for sending the control channel DMRS signal and a port for sending the CSI-RS signal.

Optionally, the first signal is a data channel DMRS signal, and the second signal is a CSI-RS signal. The obtaining a measurement quantity of the first signal based on a measurement quantity of the second signal and the quasi-co-location relationship information includes:

obtaining an average gain of the data channel DMRS signal based on an average gain of the CSI-RS signal and a quasi-co-location relationship that is with respect to an average gain and that is between a port for sending the data channel DMRS signal and a port for sending the CSI-RS signal.

Optionally, the first signal is an SRS signal, and the second signal is a CSI-RS signal. The obtaining a measurement quantity of the first signal based on a measurement quantity of the second signal and the quasi-co-location relationship information includes:

obtaining a path loss of the SRS signal based on an average gain of the CSI-RS signal and a quasi-co-location relationship that is with respect to a path loss and that is between a port for sending the SRS signal and a port for sending the CSI-RS signal.

In a possible design, the obtaining an average gain of the first signal includes:

using a value of the average gain of the second signal as a value of the average gain of the first signal; or separately obtaining an average gain of the first signal and an average gain of the second signal, and using an average gain obtained after averaging or federated filtering of the average gain of the first signal and the average gain of the second signal as the average gain of the first signal.

Optionally, the obtaining an average gain of the first signal may further include:

separately obtaining an average gain of the first signal and an average gain of the second signal in a preset time window, and using an average gain obtained after averaging or federated filtering of the average gain of the first signal and the average gain of the second signal as the average gain of the first signal.

In a possible design, the second signal is a synchronization signal block, and the synchronization signal block is a synchronization signal block received from the beam identified by the beam information.

In a possible design, the quasi-co-location relationship information includes information about a quasi-co-location relationship with respect to delay spread, Doppler spread, Doppler frequency shift, or an average delay, and the method further includes:

obtaining delay spread, Doppler spread, Doppler frequency shift, or an average delay of the first signal based on delay spread. Doppler spread, Doppler frequency shift, or an average delay of the second signal and the quasi-co-location relationship that is with respect to an average gain and that is between the port for sending the first signal and the port for sending the second signal.

Optionally, the first signal is a control channel DMRS signal, and the second signal is a CSI-RS signal. The obtaining delay spread, Doppler spread. Doppler frequency shift, or an average delay of the first signal based on delay spread, Doppler spread, Doppler frequency shift, or an average delay of the second signal and the quasi-co-location relationship that is with respect to an average gain and that is between the port for sending the first signal and the port for sending the second signal includes:

obtaining delay spread, Doppler spread, Doppler frequency shift, or an average delay of the control channel DMRS signal based on delay spread, Doppler spread, Doppler frequency shift, or an average delay of the CSI-RS signal and a quasi-co-location relationship that is with respect to an average gain and that is between a port for sending the control channel DMRS signal and a port for sending the CSI-RS signal.

Optionally, the first signal is a data channel DMRS signal, and the second signal is a CSI-RS signal. The obtaining delay spread, Doppler spread, Doppler frequency shift, or an average delay of the first signal based on delay spread, Doppler spread, Doppler frequency shift, or an average delay of the second signal and the quasi-co-location relationship that is with respect to an average gain and that is between the port for sending the first signal and the port for sending the second signal includes:

obtaining delay spread, Doppler spread, Doppler frequency shift, or an average delay of the data channel DMRS signal based on delay spread, Doppler spread, Doppler frequency shift, or an average delay of the CSI-RS signal and a quasi-co-location relationship that is with respect to an average gain and that is between a port for sending the data channel DMRS signal and a port for sending the CSI-RS signal.

In a possible design, the method further includes:

receiving a correspondence that is between beam information and a downlink signal identifier and that is sent by the base station: and establishing, based on the correspondence, a correspondence between the beam information, the downlink signal identifier, and a receive beam or a spatial parameter, that is, establishing a correspondence between the beam information, a downlink signal identifier, and a receive beam, or a correspondence between the beam information, a downlink signal identifier, and a spatial parameter.

In a possible design, the beam information of the first signal is information represented by a beam identifier, and the method further includes:

when the configuration information is received by using signaling that controls downlink transmission, determining, based on a pre-established correspondence between a beam identifier and a downlink signal identifier, that a receive beam corresponding to a downlink signal identifier corresponding to a received beam identifier is the beam for receiving the first signal.

Optionally, the beam identifier may be represented by an LOI. A quantity of bytes of the LOI may be flexibly configured based on a specific condition, for example, may be an identifier of one, two, or more bytes.

In a possible design, the beam information of the first signal is information represented by a beam identifier, and the beam information of the first signal further includes information about a spatial quasi-co-location relationship between an uplink signal represented by an uplink beam identifier and a downlink signal represented by a downlink beam identifier; and the method further includes:

when the configuration information is received by using signaling that controls downlink transmission, obtaining, based on a pre-established correspondence between a beam identifier and an uplink signal identifier, an uplink signal identifier corresponding to a received beam identifier; and determining, based on the information about the spatial quasi-co-location relationship between an uplink signal identified by an uplink beam identifier and a downlink signal represented by a downlink beam identifier, that a beam corresponding to a downlink signal identifier that is in a correspondence with the obtained uplink signal identifier is the beam for receiving the first signal.

In a possible design, the port for sending the first signal is a DMRS port, at least two DMRS ports form a DMRS port group, and the method further includes:

it is assumed that no physical channel is mapped onto an RE corresponding to a DMRS port that is different from the DMRS port for sending the first signal and that is in the DMRS port group.

In a possible design, the DMRS port is a control channel DMRS port, and the physical channel is a control channel: or the DMRS port is a data channel DMRS port, and the physical channel is a data channel.

In a possible design, when the DMRS port is a data channel DMRS port, information about the data channel DMRS port is obtained through an antenna port related field in downlink control information (DCI), and information about a quasi-co-location relationship group in which the data channel DMRS port resides is obtained through a QCL related field in the DCI.

Optionally, the antenna port related field in the DCI may be an Antenna port(s), scrambling identity and number of layers indication field in the DCI.

Optionally, the QCL related field in the DCI may be a PDSCH RE Mapping and Quasi-Co-Location Indicator field in the DCI.

According to a second aspect, an embodiment of this application provides a communication method. The method includes:

determining quasi-co-location relationship configuration information: and sending the quasi-co-location relationship configuration information to a terminal device, where the quasi-co-location relationship configuration information includes information about a first signal and quasi-co-location relationship information, and the quasi-co-location relationship information indicates that there is a quasi-co-location relationship between a port for sending the first signal and a port for sending a second signal.

In the foregoing method, by sending the configuration information of the quasi-co-location relationship to UE, configuration and sending of the quasi-co-location relationship can be implemented and the UE can obtain a measurement quantity based on the obtained quasi-co-location relationship.

In a possible design, the method further includes:

establishing a correspondence between beam information and a downlink signal identifier, and sending the correspondence between the beam information and the downlink signal identifier to the terminal device: and/or establishing a correspondence between beam information and an uplink signal identifier, and sending the correspondence between the beam information and the uplink signal identifier to the terminal device.

In a possible design, the method further includes:

directly configuring the correspondence between the beam information and the downlink signal identifier, or establishing the correspondence between the beam information and the downlink signal identifier based on a downlink beam measurement quantity that is obtained from the terminal device; or directly configuring the correspondence between the beam information and the uplink signal identifier, or establishing the correspondence between the beam information and the uplink signal identifier based on an uplink signal identifier measurement quantity that is obtained from the terminal device.

In a possible design, the port for sending the first signal is a DMRS port, at least two DMRS ports form a DMRS port group, and the method further includes:

sending indication information to the terminal device, where the indication information indicates that no physical channel is mapped onto an RE corresponding to a DMRS port that is different from the DMRS port for sending the first signal and that is in the DMRS port group.

In a possible design, the DMRS port is a control channel DMRS port, and the physical channel is a control channel; or the DMRS port is a data channel DMRS port, and the physical channel is a data channel.

In a possible design, the quasi-co-location relationship includes a quasi-co-location relationship that is with respect to an average gain and that is between the port for sending the first signal and the port for sending the second signal.

In a possible design, the quasi-co-location relationship further includes a quasi-co-location relationship that is with respect to delay spread, Doppler spread, Doppler frequency shift, or an average delay and that is between the port for sending the first signal and the port for sending the second signal.

In a possible design, the information about the first signal includes measurement information and beam information; and the measurement information includes the first signal, where the first signal is a CSI-RS signal, a control channel DMRS signal, a data channel DMRS signal, a synchronization resource block, or a phase tracking reference signal (PTRS); and the beam information is information about a beam for receiving the first signal.

In a possible design, the beam information of the first signal is information represented by a beam identifier.

In a possible design, the data channel port is sent to the terminal device through an antenna port related field in DCI, and information about a quasi-co-location relationship group in which the data channel port resides is sent to the terminal device through a QCL related field in the DCI.

According to a third aspect, an embodiment of this application provides a terminal device, where the terminal device includes a receiver and a processor.

The receiver is configured to receive configuration information sent by a base station, where the configuration information includes information about a first signal and quasi-co-location relationship information, and the quasi-co-location relationship information indicates that there is a quasi-co-location relationship between a port for sending the first signal and a port for sending a second signal.

The processor is configured to obtain a measurement quantity of the first signal based on a measurement quantity of the second signal and the quasi-co-location relationship information.

In a possible design, the measurement quantity includes at least one of the following information: a spatial parameter, an average gain, delay spread, Doppler spread, Doppler frequency shift, or an average delay.

In a possible design, the information about the first signal includes measurement information and beam information;

the measurement information includes the first signal, where the first signal is any one of a CSI-RS signal, a control channel DMRS signal, a data channel DMRS signal, a synchronization resource block, or a phase tracking reference signal (PTRS); and the beam information is information about a beam for receiving the first signal.

In a possible design, the processor is further configured to determine, based on the beam information, that a spatial quasi-co-location relationship exists between the port for sending the first signal and the port for sending the second signal.

In a possible design, the quasi-co-location relationship information includes information about a quasi-co-location relationship that is with respect to an average gain and that is between the port for sending the first signal and the port for sending the second signal: and the processor is configured to obtain an average gain of the first signal based on an average gain of the second signal and the quasi-co-location relationship that is with respect to an average gain and that is between the port for sending the first signal and the port for sending the second signal.

In a possible design, the obtaining an average gain of the first signal includes:

using a value of the average gain of the second signal as a value of the average gain of the first signal; or separately obtaining an average gain of the first signal and an average gain of the second signal, and using an average gain obtained after averaging or federated filtering of the average gain of the first signal and the average gain of the second signal as the average gain of the first signal.

In a possible design, the second signal is a synchronization signal block, and the synchronization signal block is a synchronization signal block received from the beam identified by the beam information.

In a possible design, the quasi-co-location relationship information includes information about a quasi-co-location relationship with respect to delay spread, Doppler spread, Doppler frequency shift, or an average delay; and the processor is further configured to obtain delay spread, Doppler spread. Doppler frequency shift, or an average delay of the first signal based on delay spread, Doppler spread, Doppler frequency shift, or an average delay of the second signal and the quasi-co-location relationship that is with respect to an average gain and that is between the port for sending the first signal and the port for sending the second signal.

In a possible design, the receiver is further configured to receive a correspondence that is between beam information and a downlink signal identifier and that is sent by the base station; and the processor is further configured to establish, based on the correspondence, a correspondence between the beam information, the downlink signal identifier, and a receive beam or a spatial parameter.

In a possible design, the beam information of the first signal is information represented by a beam identifier, and the processor is further configured to: when the configuration information is received by using signaling that controls downlink transmission, determine, based on a pre-established correspondence between a beam identifier and a downlink signal identifier, that a receive beam corresponding to a downlink signal identifier corresponding to a received beam identifier is the beam for receiving the first signal.

In a possible design, the beam information of the first signal is information represented by a beam identifier, and the beam information of the first signal further includes information about a spatial quasi-co-location relationship between an uplink signal represented by an uplink beam identifier and a downlink signal represented by a downlink beam identifier; and the processor is further configured to: when the configuration information is received by using signaling that controls downlink transmission, obtain, based on a pre-established correspondence between a beam identifier and an uplink signal identifier, an uplink signal identifier corresponding to a received beam identifier; and determine, based on the information about the spatial quasi-co-location relationship between an uplink signal identified by an uplink beam identifier and a downlink signal represented by a downlink beam identifier, that a beam corresponding to a downlink signal identifier that is in a correspondence with the obtained uplink signal identifier is the beam for receiving the first signal.

In a possible design, the port for sending the first signal is a DMRS port, at least two DMRS ports form a DMRS port group, and the processor is further configured to assume that no physical channel is mapped onto an RE corresponding to a DMRS port that is different from the DMRS port for sending the first signal and that is in the DMRS port group.

In a possible design, the DMRS port is a control channel DMRS port, and the physical channel is a control channel: or the DMRS port is a data channel DMRS port, and the physical channel is a data channel.

In a possible design, when the DMRS port is a data channel DMRS port, information about the data channel DMRS port is obtained through an antenna port related field in DCI, and information about a quasi-co-location relationship group in which the data channel DMRS port resides is obtained through a QCL related field in the DCI.

According to a fourth aspect, an embodiment of this application provides a communications device, where the communications device includes a processor and a transmitter.

The processor is configured to determine quasi-co-location relationship configuration information.

The transmitter is configured to send the quasi-co-location relationship configuration information to a terminal device, where the quasi-co-location relationship configuration information includes information about a first signal and quasi-co-location relationship information, and the quasi-co-location relationship information indicates that there is a quasi-co-location relationship between a port for sending the first signal and a port for sending a second signal.

In a possible design, the processor is further configured to: establish a correspondence between beam information and a downlink signal identifier, and send the correspondence between the beam information and the downlink signal identifier to the terminal device: and/or establish a correspondence between beam information and an uplink signal identifier, and send the correspondence between the beam information and the uplink signal identifier to the terminal device.

In a possible design, the processor is further configured to: directly configure the correspondence between the beam information and the downlink signal identifier, or establish the correspondence between the beam information and the downlink signal identifier based on a downlink beam measurement quantity that is obtained from the terminal device; or directly configure the correspondence between the beam information and the uplink signal identifier, or establish the correspondence between the beam information and the uplink signal identifier based on an uplink signal identifier measurement quantity that is obtained from the terminal device.

In a possible design, the port for sending the first signal is a DMRS port, at least two DMRS ports form a DMRS port group, and the transmitter is further configured to:

send indication information to the terminal device, where the indication information indicates that no physical channel is mapped onto an RE corresponding to a DMRS port that is different from the DMRS port for sending the first signal and that is in the DMRS port group.

In a possible design, the DMRS port is a control channel DMRS port, and the physical channel is a control channel: or the DMRS port is a data channel DMRS port, and the physical channel is a data channel.

In a possible design, the quasi-co-location relationship includes a quasi-co-location relationship that is with respect to an average gain and that is between the port for sending the first signal and the port for sending the second signal.

In a possible design, the quasi-co-location relationship further includes a quasi-co-location relationship that is with respect to delay spread, Doppler spread, Doppler frequency shift, or an average delay and that is between the port for sending the first signal and the port for sending the second signal.

In a possible design, the information about the first signal includes measurement information and beam information;

the measurement information includes the first signal, where the first signal is a CSI-RS signal, a control channel DMRS signal, a data channel DMRS signal, a synchronization resource block, or a phase tracking reference signal (PTRS); and the beam information is information about a beam for receiving the first signal.

In a possible design, the beam information of the first signal is information represented by a beam identifier.

In a possible design, the data channel port is sent to the terminal device through an antenna port related field in DCI, and information about a quasi-co-location relationship group in which the data channel port resides is sent to the terminal device through a QCL related field in the DCI.

According to a fifth aspect, an embodiment of this application provides a communication method. The method includes:

receiving, by a terminal device, a correspondence that is sent by a base station and that is between beam information and an uplink signal identifier; and establishing, based on the correspondence, a correspondence between the beam information, an uplink signal identifier, and a transmit beam of the terminal device or a spatial parameter.

In other words, the terminal device establishes, based on the correspondence, a correspondence between the beam information, an uplink signal identifier, and a transmit beam of the terminal device: or a correspondence between the beam information, an uplink signal identifier, and a spatial parameter.

In a possible design, the method further includes:

receiving configuration information sent by the base station, where the configuration information includes information about a first signal and quasi-co-location relationship information, and the quasi-co-location relationship information indicates that there is a quasi-co-location relationship between a port for sending the first signal and a port for sending a second signal. Optionally, the information about the first signal includes beam information, and the beam information is information represented by a beam identifier.

In a possible design, the method further includes:

when the terminal device receives, by using signaling that controls uplink transmission, the QCL related configuration information sent by the base station, determining, based on a pre-established correspondence between a beam identifier and an uplink signal identifier, that an uplink beam corresponding to an uplink signal identifier that is in a correspondence with a received beam identifier is a beam for sending the first signal.

In a possible design, the beam information of the first signal is information represented by a beam identifier, and the beam information of the first signal further includes information about a spatial quasi-co-location relationship between an uplink signal represented by an uplink beam identifier and a downlink signal represented by a downlink beam identifier: and the method further includes:

when the configuration information is received by using signaling that controls uplink transmission, obtaining, based on a pre-established correspondence between a beam identifier and a downlink signal identifier, a downlink signal identifier corresponding to a received beam identifier; and determining, based on the information about the spatial quasi-co-location relationship between an uplink signal represented by an uplink beam identifier and a downlink signal represented by a downlink beam identifier, that a beam corresponding to an uplink signal identifier that is in a correspondence with the obtained downlink signal identifier is a beam for sending the first signal.

According to a sixth aspect, an embodiment of this application provides a communication method. The method includes:

receiving PUCCH-related configuration information sent by a base station, where the configuration information includes information about an uplink transmit beam; and receiving two or more PDCCHs sent by the base station; and determining a resource location identifier of the two or more PDCCHs based on a first preset rule, and determining a resource location parameter of a PUCCH based on the determined resource location identifier; or obtaining a resource location parameter of each PUCCH, and selecting, based on a second preset rule, one resource location parameter from the obtained resource location parameters of the plurality of PUCCHs as a resource location parameter of the two or more PUCCHs.

In a possible design, there is one PUCCH and the first preset rule includes:

using a resource location identifier of a downlink beam corresponding to an uplink beam as the resource location identifier of the two or more PDCCHs.

Optionally, a terminal device receiving the PUCCH supports reciprocity between an uplink beam and a downlink beam.

The first preset rule may further include:

selecting a resource location identifier whose value is the smallest from resource location identifiers corresponding to the two or more PDCCHs as the resource location identifier of the two or more PDCCHs; or selecting a resource location identifier whose value is the largest from resource location identifiers corresponding to the two or more PDCCHs as the resource location identifier of the two or more PDCCHs; or selecting an earliest-detected resource location identifier from resource location identifiers corresponding to the two or more PDCCHs as the resource location identifier of the two or more PDCCHs.

In the foregoing method, when the two or more PDCCHs sent by the base station are received, one resource location identifier may be selected from the resource location identifiers corresponding to the two or more PDCCHs, and the resource location parameter of the PUCCH is determined based on the selected resource location identifier, or the resource location parameter of the PUCCH is determined based on the second preset rule. In this was, the resource location parameter of the PUCCH can be determined when there are a plurality of PDCCHs and one PUCCH.

In a possible design, there is one PUCCH and the second preset rule includes:

when a terminal device receiving the PUCCH supports reciprocity between an uplink beam and a downlink beam, using a PUCCH resource location parameter, obtained based on a resource location identifier of a downlink beam corresponding to an uplink beam, as the resource location parameter of the two or more PDCCHs; or using a PUCCH resource location parameter, obtained based on a resource location identifier whose value is the smallest in resource location identifiers corresponding to the two or more PDCCHs, as the resource location parameter of the two or more PDCCHs; or using a PUCCH resource location parameter, obtained based on a resource location identifier whose value is the largest in resource location identifiers corresponding to the two or more PDCCHs, as the resource location parameter of the two or more PDCCHs; or using a PUCCH resource location parameter, obtained based on an earliest-detected resource location identifier in resource location identifiers corresponding to the two or more PDCCHs, as the resource location parameter of the two or more PDCCHs.

In a possible design, there are two or more PUCCHs, a quantity of PDCCHs is greater than a quantity of PUCCHs, and the method further includes:

grouping the PDCCHs into a same quantity of groups as the quantity of PUCCHs, so that each group of PDCCHs is in a one-to-one correspondence with each PUCCH.

For one group of PDCCHs and one PUCCH, the first preset rule includes:

when a terminal device receiving the PUCCH supports reciprocity between an uplink beam and a downlink beam, using a resource location identifier corresponding to a downlink beam as the resource location identifier of the two or more PDCCHs; or selecting a resource location identifier whose value is the smallest from resource location identifiers corresponding to the two or more PDCCHs as the resource location identifier of the two or more PDCCHs; or selecting a resource location identifier whose value is the largest from resource location identifiers corresponding to the two or more PDCCHs as the resource location identifier of the two or more PDCCHs; or selecting an earliest-detected resource location identifier from resource location identifiers corresponding to the two or more PDCCHs as the resource location identifier of the two or more PDCCHs.

According to a seventh aspect, an embodiment of this application provides a communication method. The method includes:

receiving configuration information that is sent by a base station and related to two or more PUCCHs, where the configuration information includes information about an uplink transmit beam;

receiving a PDCCH sent by the base station;

obtaining a resource location identifier of the PDCCH: and determining a resource location parameter of the two or more PUCCHs based on a preset rule and the resource location identifier.

In a possible design, the preset rule includes:

using a resource location identifier of a downlink beam corresponding to an uplink beam as the resource location identifier of the PDCCH; and determining, based on the resource location identifier, a quantity notified by using RRC signaling, and offsets, a resource location parameter of each PUCCH in the two or more PUCCHs, where the offsets each are a beam difference corresponding to each PUCCH. Optionally, one of the offsets is zero. Optionally, a terminal device receiving the PUCCH supports reciprocity between an uplink beam and a downlink beam.

Optionally, the determining, based on the resource location identifier, a quantity notified by using RRC signaling, and offsets, a resource location parameter of each PUCCH in the two or more PUCCHs may be: determining the resource location parameter of each PUCCH in the two or more PUCCHs by summing up the resource location identifier, the quantity notified by using RRC signaling, and the offset.

Optionally, the preset rule may further include:

determining a resource location parameter of each PUCCH in the two or more PUCCHs based on the resource location identifier and a value that is configured by using higher layer signaling and that is related to a beam for sending the PUCCH. Optionally, the resource location parameter of each PUCCH in the two or more PUCCHs may be determined by summing up the resource location identifier and the value that is configured by using higher layer signaling and that is related to the beam for sending the PUCCH.

Optionally, the preset rule may further include:

determining a resource location parameter of one PUCCH based on the resource location identifier, and using the determined resource location parameter of the PUCCH as the resource location parameter of the two or more PUCCHs.

In a possible design, the PUCCHs are grouped into a same quantity of groups as a quantity of PDCCHs, so that each group of PUCCHs is in a one-to-one correspondence with each PDCCH.

For a plurality of PUCCHs in each PUCCH group and one PDCCH, the preset rule includes:

using a resource location identifier of a downlink beam corresponding to an uplink beam as the resource location identifier of the PDCCH; and determining, based on the resource location identifier, a quantity notified by using RRC signaling, and offsets, a resource location parameter of each PUCCH in the two or more PUCCHs, where the offsets each are a beam difference corresponding to each PUCCH. Optionally, one of the offsets is zero. Optionally, a terminal device receiving the PUCCH supports reciprocity between an uplink beam and a downlink beam.

Optionally, the determining, based on the resource location identifier, a quantity notified by using RRC signaling, and offsets, a resource location parameter of each PUCCH in the two or more PUCCHs may be: determining the resource location parameter of each PUCCH in the two or more PUCCHs by summing up the resource location identifier, the quantity notified by using RRC signaling, and the offset.

Optionally, the preset rule may further include:

determining a resource location parameter of each PUCCH in the two or more PUCCHs based on the resource location identifier and a value that is configured by using higher layer signaling and that is related to a beam for sending the PUCCH. Optionally, the resource location parameter of each PUCCH in the two or more PUCCHs may be determined by summing up the resource location identifier and the value that is configured by using higher layer signaling and that is related to the beam for sending the PUCCH.

Optionally, the preset rule may further include:

determining a resource location parameter of one PUCCH based on the resource location identifier, and using the determined resource location parameter of the PUCCH as the resource location parameter of the two or more PUCCHs.

An embodiment of this application further provides a communications system, including the terminal device in the third aspect and the communications device in the fourth aspect.

An embodiment of this application further provides a communications device, including a memory, a processor, and a computer program that is stored in the memory and can be run on the processor. When the processor executes the program, the communications device is enabled to implement steps performed in the method according to the first aspect, the second aspect, the fifth aspect, the sixth aspect, or the seventh aspect.

An embodiment of this application further provides a computer readable medium, configured to store a computer program. When the computer program is run, the method according to the first aspect, the second aspect, the fifth aspect, the sixth aspect, or the seventh aspect is performed.

An embodiment of this application further provides a computer program product including an instruction. When the computer program product is run on a computer, the computer is enabled to perform the method according to any one of the foregoing possible implementations.

BRIEF DESCRIPTION OF DRAWINGS

To describe the technical solutions in the embodiments of this application more clearly, the following briefly describes the accompanying drawings required for describing the embodiments. Apparently, the accompanying drawings in the following description show merely some embodiments of this application, and a person of ordinary skill in the art may still derive other drawings from these accompanying drawings without creative efforts.

FIG. 3(a) is a schematic diagram of an implementation of channel measurement related QCL configuration information sent by a base station to UE according to an embodiment of this application:

FIG. 3(b) is a schematic diagram of another implementation of channel measurement related QCL configuration information sent by a base station to UE according to an embodiment of this application;

FIG. 3(c) is a schematic diagram of an implementation of path loss related QCL configuration information sent by a base station to UE according to an embodiment of this application;

FIG. 4(a) is a schematic diagram of a correspondence that is maintained by UE and that is between an LOT, a downlink signal identifier, and a spatial parameter according to an embodiment of this application;

FIG. 4(b) is a schematic diagram of a correspondence that is maintained by a base station and that is between an LOI and a downlink signal identifier according to an embodiment of this application;

FIG. 4(c) is a schematic diagram of a correspondence between an LOI, a downlink signal identifier, and a spatial parameter, where the correspondence is maintained by UE based on a correspondence that is sent by a base station and that is between an LOI and a downlink signal identifier according to an embodiment of this application;

FIG. 5(a) is a schematic diagram of a correspondence that is maintained by UE and that is between an LOI, an uplink signal identifier, and a spatial parameter according to an embodiment of this application;

FIG. 5(b) is a schematic diagram of a correspondence that is maintained by a base station and that is between an LOI and an uplink signal identifier according to an embodiment of this application;

FIG. 8(a) is a schematic diagram of an implementation of control channel related QCL configuration information sent by a base station to UE according to an embodiment of this application;

FIG. 8(b) is a schematic diagram of another implementation of control channel related QCL configuration information sent by a base station to UE according to an embodiment of this application;

FIG. 9(a) is a schematic diagram of a type of control information sent by a base station to UE 1 when the UE 1 and UE 2 are located on a same panel according to an embodiment of this application:

FIG. 9(b) is a schematic diagram of another type of control information sent by a base station to UE 1 when the UE 1 and UE 2 are located on a same panel according to an embodiment of this application:

FIG. 12(a) is a schematic diagram of an implementation of data channel related QCL configuration information sent by a base station to UE according to an embodiment of this application;

FIG. 12(b) is a schematic diagram of another implementation of data channel related QCL configuration information sent by a base station to UE according to an embodiment of this application;

DESCRIPTION OF EMBODIMENTS

Figure 1:
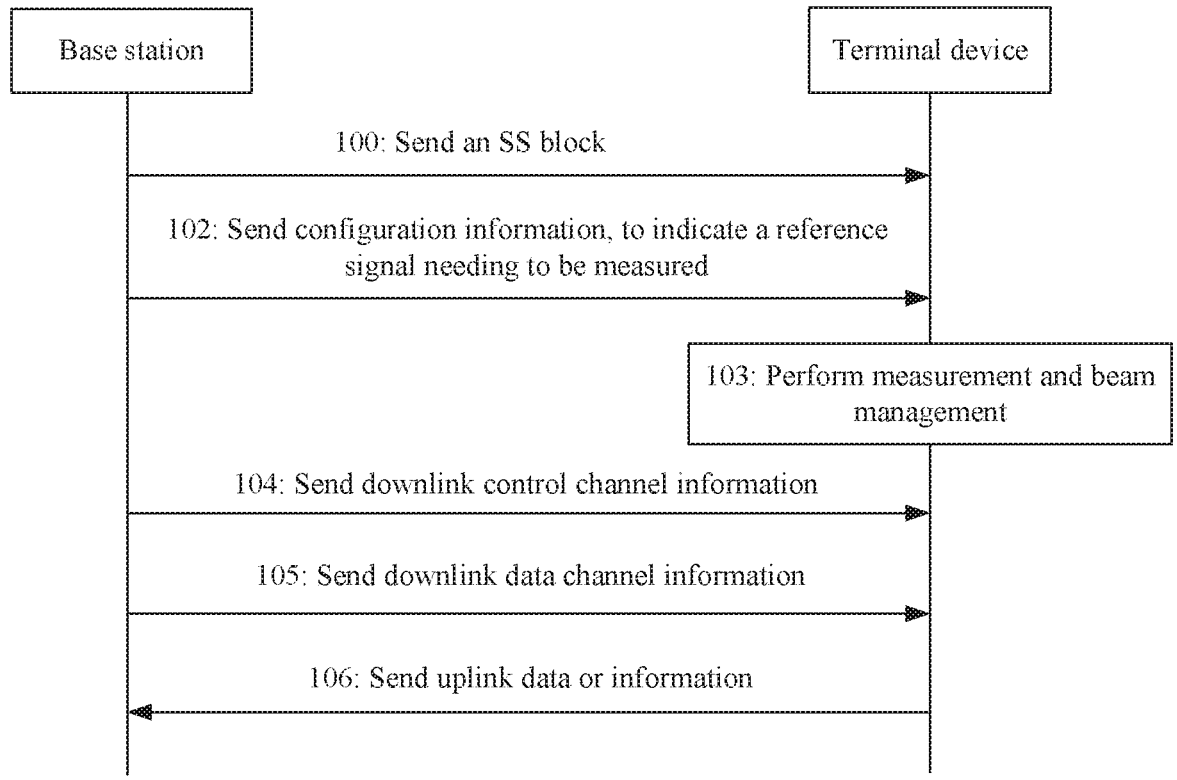
FIG. 1 is a basic schematic flowchart of a process of interaction between a base station and UE according to an embodiment of this application.

The following describes embodiments of this application with reference to the accompanying drawings.

First, some terminologies and related technologies in this application are explained for ease of understanding.

(1) Terminal Device

The terminal device in this application is a device having a wireless communication function, and may be a handheld device, an in-vehicle device, a wearable device, or a computing device having a wireless communication function, another processing device connected to a wireless modem, or the like. The terminal device in different networks may have different names, for example: user equipment, an access terminal, a subscriber unit, a subscriber station, a mobile station, a remote station, a remote terminal, a mobile device, a user terminal, a terminal, a wireless communications device, a user proxy or user apparatus, a cellular phone, a cordless telephone, a session initiation protocol (SIP) phone, a wireless local loop (WLL) station, personal digital assistant (PDA), or a terminal device in a 5G network or a future evolved network.

(2) Base Station

The base station in this application may also be referred to as a base station device, and is a device deployed in a wireless access network to provide a wireless communication function. The base station may be a base transceiver station (BTS) in global system for mobile communications (GSM) or code division multiple access (CDMA): or may be a NodeB (NB) in wideband code division multiple access (WCDMA): or may be an evolved NodeB (eNB or eNodeB), a relay station, or an access point in long term evolution (LTE); or a transmission point or a transmission reception point (TRP or TP), or a next-generation NodeB (gNB) in an NR system or a station, a wireless backhaul node, a small cell, or a micro base station in wireless fidelity (Wi-Fi); or a base station in a future 5th generation mobile communication (5G) network, or the like. This is not limited in this application.

(3) Quasi-Co-Location (QCL)

A quasi-co-location relationship is used to indicate that a plurality of resources have one or more same or similar communication characteristics. A plurality of resources in a quasi-co-location relationship with each other may use same or similar communication configurations. For example, if two antenna ports have a quasi-co-location relationship, a large-scale characteristic of a channel over which a symbol on one port is conveyed can be inferred from a large-scale characteristic of a channel over which a symbol on the other port is conveyed. The large-scale characteristic may include: delay spread, an average delay, Doppler spread, Doppler frequency shift, an average gain, transmit/receive channel correlation, a receive angle of arrival, spatial correlation of a receiver antenna, a dominant angle of arrival (AoA), an average angle of arrival. AoA extension, or the like. Specifically, that a quasi-co-location indication is used to indicate whether at least two groups of antenna ports have a quasi-co-location relationship is as follows: The quasi-co-location indication is used to indicate whether channel state information reference signals sent on the at least two groups of antenna ports come from a same transmission point, or the quasi-co-location indication is used to indicate whether channel state information reference signals sent on the at least two groups of antenna ports come from a same beam group.

(4) Quasi-Co-Location Assumption (QCL Assumption)

The quasi-co-location assumption means making an assumption that a QCL relationship exists or does not exist between two ports. Configuration and indication of the quasi-co-location assumption may be used to help a receive end perform signal receiving and demodulation. For example, if the receive end can determine that a QCL relationship exists between a port A and a port B, a large-scale parameter of a signal measured on the port A may be used for measurement and demodulation of a signal on the port B.

(5) Spatial Quasi-Co-Location (Spatial QCL)

Spatial quasi-co-location is a type of QCL.

For example, if two antenna ports have a spatial quasi-co-location relationship, a large-scale characteristic of a channel over which a symbol on one port is conveyed can be inferred from a large-scale characteristic of a channel over which a symbol on the other port is conveyed. The large-scale characteristic may include: transmit/receive channel correlation, a receive angle of arrival, spatial correlation of a receiver antenna, a dominant angle of arrival (AoA), an average angle of arrival, AoA extension, or the like.

From the perspective of a transmit end, if two antenna ports are spatially quasi-co-located with each other, beam directions corresponding to the two antenna ports are consistent in space. From the perspective of a receive end, if two antenna ports are spatially quasi-co-located with each other, it means that the receive end can receive, in a same beam direction, signals sent on the two antenna ports.

(6) Beam

A beam may be a wide beam, or a narrow beam, or another type of beam. A technology for forming a beam may be a beamforming technology or another technical means. The beamforming technology may be specifically a digital beamforming technology, an analog beamforming technology, or a hybrid technology that combines digital beamforming and analog beamforming. Different beams may be considered as different resources. Same or different information may be sent by using different beams. Optionally, a plurality of beams having same or similar communication characteristics may be considered as one beam. One or more antenna ports may be included within one beam, to transmit a data channel, a control channel, a sounding signal, or the like. For example, a transmit beam may be signal strength distribution formed in different directions in space after a signal is transmitted by using an antenna, and a receive beam may be signal strength distribution, in different directions in space, of a radio signal received on an antenna. One or more antenna ports forming a beam may also be considered as an antenna port set. In addition, a beam may be a spatial filter (spatial filter) or a spatial parameter (spatial parameter).

Information about a beam may be identified by index information. Optionally, the index information may correspond to a resource identifier configured for UE. For example, the index information may correspond to a configured ID or resource of a channel state information reference signal (CSI-RS), or may correspond to a configured ID or resource of an uplink sounding reference signal (SRS). Alternatively, optionally, the index information may be index information explicitly or implicitly carried by a signal or channel that is carried by the beam. For example, the index information of the beam may be indicated by a synchronization signal or broadcast channel sent by using the beam.

Alternatively, optionally, an identifier of the information about the beam may include: an absolute index of the beam, a relative index of the beam, a logical index of the beam, an index of an antenna port corresponding to the beam, an index of an antenna port group corresponding to the beam, a time index of a downlink synchronization signal block, beam pair link (BPL) information, a transmit parameter (Tx parameter) corresponding to the beam, a receive parameter (Rx parameter) corresponding to the beam, a transmit weight, weight matrix, or weight vector (weight, weight matrix, weight vector) corresponding to the beam, a receive weight corresponding to the beam, indexes of the weights, a transmit codebook (codebook) corresponding to the beam, a receive codebook corresponding to the beam, or indexes of the codebooks.

A beam pair may include a transmit beam at a transmit end and a receive beam at a receive end, or may be referred to as an uplink beam or a downlink beam. For example, a beam pair may include a gNB Tx beam and a UE Rx beam, or a UE Tx beam and a gNB Rx beam, where the Tx beam may also be understood as a transmit beam.

(7) Reference Signals and Antenna Ports in NR

In NR, a correspondence between a reference signal and an antenna port may be shown in the following table:

| Reference signal | Antenna port |
| --- | --- |
| SSS/PSS | S0 |
| CSI-RS | C1-CM |
| DL DMRS | D1-DN |
| PTRS | P1-PW |
| SRS | S1-SX |
| UL DMRS | U1-UY |

M, N, W, X, and Y each represent a maximum quantity of ports for a type of reference signal. It should be noted that the foregoing correspondence between a reference signal and an antenna port is merely an example for description, and there may be another correspondence during specific implementation.

Antenna ports for different types of RSs may be the same. For example, a port D1 for a DMRS may be the same as a port S0 for a synchronization signal. Maximum quantities of antenna ports of different types of reference signals are not definite. Possibly, a maximum quantity of ports for a CSI-RS may be 32, and a maximum quantity of ports for a DMRS may be 12.

(8) Communication Resource

In this application, a communication resource may also be referred to as a resource for short. A communication resource may be used to transmit a signal. There are a plurality of types of communication resources. For example, from the perspective of physical characteristics, a type of communication resource may be a spatial resource, a time-domain resource, or a frequency-domain resource. For example, from the perspective of different representation forms, communication resources may be classified into the following types: a beam, a port, and the like. A set of communication resources of different types is also a type of communication resource. For example, a time-frequency resource (including a time domain resource and a frequency domain resource) is a type of communication resource, and a combination of a beam and a port is also a type of communication resource.

(9) Brief Description of an LTE PDCCH Structure

Four consecutive REs (without counting a resource location occupied by a reference signal) form one resource element group (REG). An REG is identified by an index pair (k', l'). A basic unit of a control channel is a control channel element (CCE). One CCE includes nine REGs. PDCCH transmission is performed by using different aggregation levels (AL). The aggregation level means a quantity of CCEs on which a PDCCH is carried. The aggregation level may be 1, 2, 4, or 8.

(10) Other Terms

The term "a plurality of" in this application means two or more than two.

The term "and/or" in this specification describes merely an association relationship for describing associated objects and indicates that three relationships may exist. For example, A and/or B may represent the following three cases: Only A exists, both A and B exist, and only B exists. In addition, the character "I" in this specification generally indicates an "or" relationship between the associated objects.

The terms "first" and "second" in this application are merely intended for a purpose of description, and shall not be understood as an indication or implication of relative importance or as an implicit indication of a quantity of indicated technical features. Therefore, a feature limited by "first" or "second" may explicitly or implicitly include one or more of the features.

1. Description Related to QCL in an LTE System

In the LTE system, a channel is sent in radio frames. One radio frame (radio frame) includes 10 subframes (subframe). A length of each subframe is 1 millisecond (ms). Each subframe includes two slots (slot). Each slot is 0.5 ms. A quantity of symbols included in each slot depends on a length of a cyclic prefix (CP) in the subframe. If the CP is a normal (normal) CP, each slot includes seven symbols and each subframe includes 14 symbols. For example, each subframe includes symbols whose sequence numbers are respectively #0, #1, #2, #3, #4, #5, #6, #7, #8, #9, #10, #11, #12, and #13. If the CP is an extended (extended) CP, each slot includes six symbols and each subframe includes 12 symbols. For example, each subframe includes symbols whose sequence numbers are respectively #0, #1, #2, #3, #4, #5, #6. #7, #8, #9, #10, and #11. A downlink symbol is referred to as an orthogonal frequency division multiplexing (OFDM) symbol. In the LTE system, a resource element (RE) is a minimum unit in time and frequency domains, and is uniquely identified by an index pair (k,l), where k is a subcarrier index and l is a symbol index.

Brief description of configuration and indication of a QCL assumption in LTE (1) Configuration of a QCL Assumption in LTE QCL relationships with respect to various parameters between antenna ports are fixedly specified in LTE protocols. UE may make different QCL assumptions between ports based on different transmission modes. Unless otherwise stated, a port mentioned in the embodiments of this application is an antenna port.

For example, for transmission modes 8 to 10, UE may assume that antenna ports 7 to 14 have QCL with respect to five parameters, namely, delay spread, Doppler spread, Doppler frequency shift, an average gain, and an average delay: for transmission modes 1 to 9, antenna ports 0 to 3, 5, and 7 to 30 have QCL with respect to four parameters, namely. Doppler frequency shift, Doppler spread, delay spread, and an average delay: and for a transmission mode 10, two QCL relationships may be configured for antenna ports 7 to 14 by using higher layer signaling qcl-Operation. One QCL relationship is: UE may assume that antenna ports 0 to 3 and 7 to 30 have QCL with respect to four parameters, namely. Doppler frequency shift, Doppler spread, delay spread, and an average delay. The other QCL relationship is: UE may assume that a CSI-RS antenna port indicated by using higher layer signaling qcl-CSI-RS-ConfigNZPId-r11 among antenna ports 15 to 30, and antenna ports 7 to 14 have QCL with respect to four parameters, namely, Doppler frequency shift, Doppler spread, delay spread, and an average delay.

The foregoing transmission modes are notified by a base station to the UE by using higher layer signaling.

(2) Indication and Purpose of a QCL Assumption in LTE

A parameter set configured by using higher layer signaling may provide time-frequency mapping patterns for various reference signals. A data channel PDSCH can no longer be mapped onto an RE onto which a reference signal has been mapped. Information about a QCL assumption is used in procedures such as rate matching, antenna port mapping, and time-frequency resource mapping on a base station side, and demapping and rate de-matching on a UE side.

(3) Reference Signals, Antenna Ports, and Physical Channels in LTE

A reference signal is mainly used to estimate a channel parameter, to help demodulation of a physical channel.

For example, in downlink communication, downlink reference signals in LTE include a synchronization signal (SS), a cell-specific reference signal (CRS), a CSI-RS, a DMRS, and the like. The SS is further classified into a primary synchronization signal (PSS) and a secondary synchronization signal (SSS).

Downlink physical channels in LTE include but are not limited to: a physical broadcast channel (PBCH), a physical downlink control channel (PDCCH), and a physical downlink shared channel (PDSCH), where the PDSCH is also referred to as a downlink data channel.

Antenna ports for various reference signals and physical channels in LTE have corresponding rules. For example, a base station performs communication by using an antenna port, and the base station first sends an SS and a PBCH by using an antenna port 0, and also sends a CRS by using the antenna port 0. Sending of a PDCCH after user access is the same as the sending of the PBCH. Channel estimation and demodulation are performed on the PDCCH by using a CRS. If the base station does not send a DMRS, demodulation of the PDSCH is also performed by using a CRS. In other words, the PDSCH is also sent based on the antenna port 0. For some transmission modes, if a DMRS is sent, the PDSCH is demodulated by using the DMRS, that is, the PDSCH is sent by using a port on which the DMRS is sent.

2. Implementation Related to QCL in an NR System

In NR. QCL related technical solutions in LTE cannot adapt to a requirement of NR because of new features of NR, especially beam-based transmission. More specifically, in NR, there is only the beam-based transmission, and there is no CRS transmission any longer. PDCCH demodulation is no longer CRS-based, and there are no transmission modes in NR that are the same as those in LTE. All these affect applicability of the QCL related technical solutions in LTE to NR.

The embodiments of this application provide a communication method and a communications device, to implement configuration, indication, and use of QCL in NR.

In mobile communication, before UE communicates with a base station, usually, the UE first attempts to establish a connection to the base station. To be specific, the base station sends signals by using beams in different directions, and if the UE enters a coverage area of the base station, the UE attempts to access the base station by receiving a signal in a beam direction or signals in several beam directions, that is, attempts to establish a communication connection to the base station by receiving a signal sent by the base station.

A manner in which the base station sends a signal and the UE receives the signal includes, but is not limited to, the following two manners. In Manner A, the base station finishes sweeping N beam directions of the base station within n milliseconds; the UE attempts to perform reception in a receive beam direction 1 of the UE, where a time window is n milliseconds or greater than n milliseconds; then the UE attempts to receive a signal in a receive beam direction 2; and so on. After sweeping all N receive beams of the UE, the UE selects a relatively strong receive beam and a corresponding transmit beam, to perform a subsequent access process. In Manner B, a threshold is preset, and the UE can perform a subsequent access process on a corresponding beam provided that received energy of the UE is greater than the threshold.

In a general case, the base station sends SS blocks in different beam directions at different time points, and the UE may receive, in a beam direction, the SS block sent by the base station. Optionally, the base station may send a plurality of SS blocks through a port in different beam directions. The SS block is a type of synchronization signal. The UE attempts to access the base station by receiving the SS block sent by the base station. In step 100 shown in FIG. 1, a base station sends an SS block to UE.

FIG. 1 is a basic schematic flowchart of a process of interaction between a base station and UE. It may be understood that, during specific implementation, there is another process of interaction between the base station and the UE, and for ease of description, only some steps and processes are shown in this embodiment of this application. For example, the UE may further initiate random access after step 100, and there are a random access procedure and the like between the UE and the base station. Such processes are not shown in FIG. 1.

After the UE accesses a network, the base station sends configuration information to the UE, to indicate a reference signal that needs to be measured by the UE (step 102). After receiving the configuration information sent by the base station, the UE performs signal measurement (step 103) based on the indication from the base station. This process enables the base station to learn of a status of a channel between the base station and the UE, for example, quality of a beam between the base station and the UE.

After the UE completes channel measurement, the base station sends information about a downlink control channel to the UE (step 104) and information about a downlink data channel to the UE (step 105), to implement sending of downlink control information and data information. Correspondingly, the UE sends an uplink signal, an uplink data channel, or an uplink control channel to the base station in step 106.

In the foregoing communication process, such as step 102, step 104, and step 105, when sending related information to the UE, the base station may indicate a quasi-co-location relationship to the UE. The UE obtains the related information based on the quasi-co-location relationship indicated by the base station. For example, the UE may obtain an average gain of another signal based on a quasi-co-location relationship that is with respect to an average gain and that is indicated by the base station and exists between a port for sending a measurement signal and a port for sending the another signal, and use the obtained average gain as an average gain of the measurement signal.

The following separately describes methods, provided in the embodiments of this application, for implementing configuration, indication, and use of QCL in NR based on: an implementation of an applicable quasi-co-location relationship for the UE to receive the indication from the base station to perform channel measurement in step 102, an implementation of an applicable quasi-co-location relationship for the UE to receive the downlink control channel information sent by the base station in step 104, and an implementation of an applicable quasi-co-location relationship for the UE to receive the downlink data channel information sent by the base station in step 105. It may be understood that, for other processing manners that require QCL, refer to these implementations, and only a corresponding parameter needs to be adjusted correspondingly.

3. Implementation of QCL Related to Channel Measurement in an NR System

Figure 2:
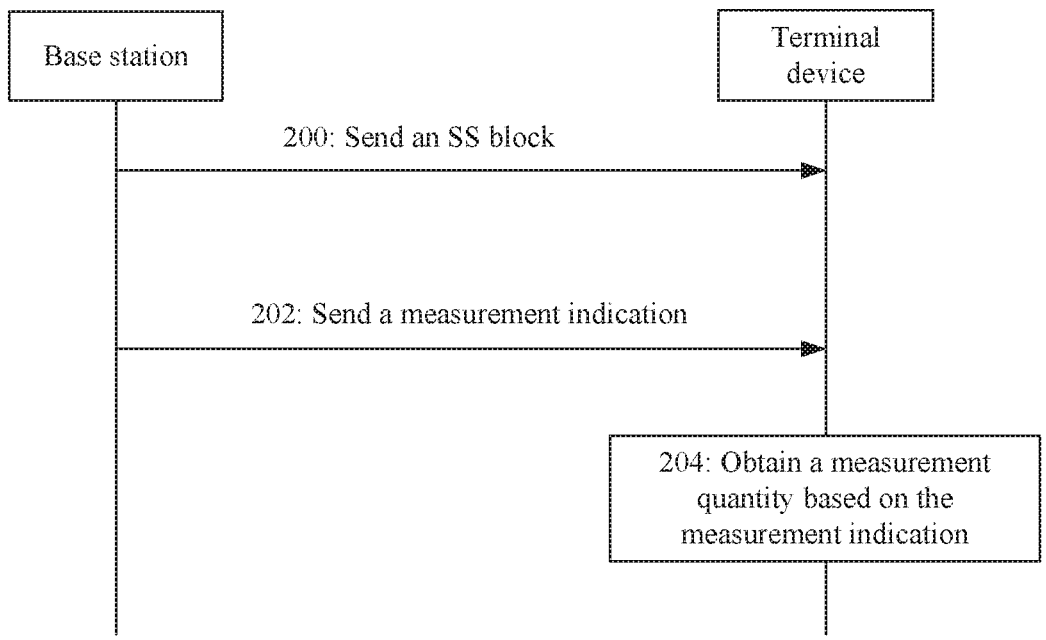
FIG. 2 is a schematic flowchart of a communication method according to an embodiment of this application.

An implementation of an applicable quasi-co-location relationship for UE to receive an indication from a base station to perform channel measurement may be shown in FIG. 2. An implementation process of a method shown in FIG. 2 includes the following steps.

Step 200: The UE receives an SS block sent by the base station.

The base station sends SS blocks through a port in different beam directions at different time points. The UE attempts to receive, within a coverage area of the base station, the SS block sent by the base station. In other words, the base station sends the SS block in a beam sweeping manner, and the UE receives, in a beam direction, the SS block sent by the base station. In addition, after receiving the SS block sent by the base station, the UE measures an average gain of the received SS block. In this embodiment, description is given by using an example in which the base station sends the SS block through a port. For a manner in which the base station sends another synchronization signal, refer to the implementation of sending the SS block.

The SS block includes an SSS, a PSS, and a PBCH.

Step 202: The UE receives a measurement indication sent by the base station, where the measurement indication includes measurement information, beam information, and quasi-co-location relationship information.

The measurement information includes information about a signal needing to be measured. Optionally, the measurement information further includes information, such as a parameter needing to be measured (for example, RSRP or CQI) and a feedback manner of a measurement quantity.

In this embodiment of this application, a measurement quantity is a measured value of a parameter needing to be measured, or a value or quantity obtained after the parameter needing to be measured is measured. The measurement quantity may also be referred to as a measurement result.

The beam information is information about a beam for receiving the signal needing to be measured.

The quasi-co-location relationship information is information about a quasi-co-location relationship between a port for sending the signal needing to be measured and another port.

It should be noted that, the base station may separately send, by using different types of signaling, the measurement information, the beam information, and the quasi-co-location relationship information that are included in the measurement indication. Such types of signaling include but are not limited to RRC signaling, MAC-CE signaling, or DCI.

Step 204: The UE obtains a measurement quantity based on the indication from the base station.

To be specific, the UE receives, based on the measurement indication sent by the base station, the signal needing to be measured from the receive beam; and obtains, based on the quasi-co-location relationship information, the measurement quantity of the signal needing to be measured.

The following describes in detail the implementation shown in FIG. 2 by using an example in which the signal needing to be measured is a CSI-RS signal and an average gain of the CSI-RS signal needs to be measured. It may be understood that, for an implementation of performing channel measurement on another signal (for example, a DMRS signal for a PDCCH or a PDSCH), refer to the following implementation for a CSI-RS signal.

In step 202, the base station may send a measurement indication to the UE by using radio resource control (RRC) signaling. The measurement information included in the measurement indication may be a CSI-RS resource. The CSI-RS resource includes but is not limited to: a resource number of the CSI-RS signal, a time at which the CSI-RS signal is sent, a frequency on which the CSI-RS signal is sent, a signal sending period (periodic or aperiodic), and a port for sending the CSI-RS signal. Such information is configured by the base station and sent by the base station to the UE. The UE receives, based on an indication of such information, a CSI-RS signal sent by the base station. Optionally, a CSI-RS resource may be represented by a CSI-RS resource number (CSI-RS resource ID).

Optionally, the CSI-RS resource may further include a CSI-RS resource setting, or a CSI-RS reporting setting, or the like. The CSI-RS resource setting includes one or more CSI-RS resource sets, and each CSI-RS resource set further includes one or more CSI-RS resources.

During specific implementation, the UE can receive a corresponding CSI-RS signal only when the base station sends the CSI-RS signal based on the CSI-RS resource. For example, if the CSI-RS signal needing to be measured is configured on a (k,l) time-frequency resource of a subframe X and uses two ports, the base station configures the CSI-RS signal on the (k,l) time-frequency resource of the subframe X and sends the CSI-RS signal to the UE.

When the signal needing to be measured is a CSI-RS signal, the beam information is information about a beam for receiving, by the UE, the CSI-RS signal needing to be measured. The beam information may include at least one of the following information: an index of the beam, an index of an antenna port corresponding to the beam, an index of a reference signal corresponding to the beam, a time index of a downlink synchronization signal block, or beam pair link (BPL) information.

Optionally, the UE may receive, by using MAC-CE signaling or DCI in addition to the RRC signaling, the information that is sent by the base station and that is about the beam for receiving the CSI-RS signal.

The following describes, by using FIG. 3(a) and FIG. 3(b) as an example, a manner in which the base station configures the measurement indication and a manner in which the UE obtains the measurement quantity.

In FIG. 3(a), a QCL type 1 indicates that a QCL relationship with respect to an average gain exists between an SS port and a CSI-RS resource. A QCL type 3 indicates beam information (for example, an SS block time index). The UE learns, based on the beam information, that a spatial QCL relationship exists between an antenna port for sending a CSI-RS signal and the SS port.

Because an SS block is sent by the base station from the SS port, when the UE receives configuration information that is sent by the base station and that is about the QCL type 1, the UE can learn, based on the configuration information that is indicated by the QCL type 1 and that is about the SS port and the CSI-RS resource, that a quasi-co-location relationship with respect to an average gain exists between the SS port and a port for sending a CSI-RS signal corresponding to the CSI-RS resource.

Optionally, when the CSI-RS resource includes a plurality of ports, it means that a QCL relationship with respect to an average gain exists between each port in the plurality of ports and the SS port. When the QCL relationship that is with respect to an average gain and that is indicated by the QCL type 1 exists between a plurality of ports included in a CSI-RS resource, the CSI-RS resource in FIG. 3(a) may be represented by a CSI-RS resource number. When the QCL relationship that is with respect to an average gain and that is indicated by the QCL type 1 does not exist between a plurality of ports included in a CSI-RS resource, the CSI-RS resource in FIG. 3(a) may be represented by a CSI-RS port number. For example, a CSI-RS resource includes two ports: a port 1 and a port 2. If the QCL relationship with respect to an average gain does not exist between the port 1 and the port 2, the base station uses a port identifier to represent the CSI-RS resource when configuring the QCL type 1. The base station configures the QCL type 1 and sends the QCL type 1 to the UE for only a port that has a QCL relationship with the SS port with respect to an average gain. In this way, when receiving the configuration information that is sent by the base station and that is about the QCL type 1, the UE can learn which port is in a QCL relationship with the SS port with respect to an average gain.

In this embodiment of this application, a manner in which the base station sends the QCL type 1 may be: adding a field to signaling (for example, RRC signaling) to be sent to the UE, where the field indicates that the QCL relationship with respect to an average gain exists between the SS port and the CSI-RS resource. A manner in which the base station sends the QCL type 3 may be: adding a field to signaling (for example, MAC-CE signaling) to be sent to the UE, where the field indicates the beam for receiving the CSI-RS resource by the UE and indicates that the spatial QCL relationship exists between the port for sending the CSI-RS resource and the SS port.

After receiving configuration information that is sent by the base station and that is about the QCL type 1 and the QCL type 3, the UE can learn of information about the beam for receiving the CSI-RS resource needing to be measured and related QCL relationship information. Then the UE can receive the CSI-RS signal in a beam direction indicated by the QCL type 3, and uses, based on the QCL relationship that is with respect to an average gain and that is indicated by the QCL type 1 and is between the SS port and the CSI-RS resource, an average gain of an SS block that is received in the beam direction indicated by the QCL type 3 as an average gain of the CSI-RS signal needing to be measured.

In this embodiment of this application, a manner in which the UE obtains the average gain of the CSI-RS signal based on the configuration information indicated by the QCL type 1 and the QCL type 3 includes but is not limited to the following manners:

Manner 1: The UE directly uses a measured average gain of an SS block that is received in the beam direction indicated by the QCL type 3 as the average gain of the CSI-RS signal. For example, an L1 SS block RSRP value that is obtained after measurement of an SS block in the beam direction indicated by the QCL type 3 is used as an L1 RSRP value of the CSI-RS signal, and RSRP of the CSI-RS signal is no longer measured.

Manner 2: The UE performs averaging or federated filtering on a measured average gain of an SS block that is received in the beam direction indicated by the QCL type 3, to obtain a final average gain of the CSI-RS signal. For example, the UE measures a CSI-RS signal that is received in the beam direction indicated by the QCL type 3, to obtain an L1 CSI-RS RSRP value, and then performs averaging or federated filtering on the L1 CSI-RS RSRP value and a measured L1 SS block RSRP value of an SS block, to obtain a more accurate and stable L1 RSRP value.

Manner 3: When the configuration information sent by the base station to the UE further includes a measurement time window, the UE performs, within the measurement time window, averaging or federated filtering on a measured L1 CSI-RS RSRP value and a measured L1 SS block RSRP of an SS block, to obtain a more accurate and stable L1 RSRP value.

Further, when the base station sends an indication to the UE based on the configuration of the QCL type 3, to reduce occupation of a time-frequency resource, a low overhead indicator (LOI) may substitute for the foregoing CSI-RS resource identifier, port number, or the like, to indicate the spatial QCL relationship and the receive beam direction to the UE. Because the CSI-RS resource identifier, the port number, or the like requires a relatively large quantity of bits, a relatively large quantity of time-frequency resources are occupied. In contrast, a quantity of bits occupied by the LOI is less than a quantity of bits occupied by the CSI-RS resource identifier, the port number, or the like, the LOI can reduce time-frequency resource occupation. It should be noted that, the LOI is merely a temporary name for a beam indication, and the beam indication may alternatively be any identifier used to represent a beam.

To send the indication to the UE by using an LOI, the base station needs to establish a correspondence between an LOI and a transmit beam. In addition, the UE needs to establish a correspondence between an LOI, a receive beam, and a corresponding transmit beam of the base station. The following describes, by using a CSI-RS signal as an example, a manner of establishing and maintaining, by the base station and/or the UE, a correspondence between an LOI and a beam in three scenarios respectively: a downlink transmit beam scenario, an uplink transmit beam scenario, and a scenario in which the UE supports beam reciprocity. It may be understood that, for implementation of LOI-related configuration and management of a signal such as an SS block, also refer to the manner of the CSI-RS signal, and details are not described again.

The beam reciprocity means that a device can ensure implementation of consistency between a receive beam direction and a transmit beam direction. For example, that the UE supports beam reciprocity means that the UE can ensure implementation of consistency between a receive beam direction and a transmit beam direction. When beam reciprocity exists, an uplink beam and a downlink beam can be uniformly managed. When beam reciprocity does not exist, uplink beam management and downlink beam management are separately performed.

(1) Method for Managing a Downlink Transmit Beam

First, for beam-based communication between a base station and UE, the UE maintains a correspondence between a receive beam of the UE, a transmit beam of the base station, and an LOI based on an indication from the base station. As shown in FIG. 4(a), a CRI #0 represents a downlink signal identifier, where the downlink signal identifier is also a transmit beam of the base station; an Rx parameter #0 represents a spatial parameter (spatial parameter), where the spatial parameter is also a receive beam of the UE: and an LOI uses a relatively small quantity of bits to represent the CRI #0. Optionally, in FIG. 4(a), an SS block time index #0 may alternatively be used to substitute for the CRI #0.

In this embodiment of this application, the spatial parameter may be alternatively an antenna structure or a weight of a radio frequency link.

Then, the base station instructs the UE to measure another CSI-RS signal. For example, the base station instructs the UE to measure CSI-RS signals in different transmit beam directions and feed back L1-RSRP corresponding to each CRI. The beams in the different beam directions are represented by a CRI #1, a CRI #2, a CRI #3, and a CRI #4.

When instructing the UE to measure the CSI-RS signals in the transmit beam directions of the CRI #1, the CRI #2, the CRI #3, and the CRI #4, the base station may notify the UE that a spatial QCL relationship exists between the beam directions of the CRI #1, the CRI #2, the CRI #3, and the CRI #4 needing to be measured and a beam direction of the CRI #0. Based on the notification from the base station, the UE receives, in a receive direction that is the same as a receive direction of the CRI #0, the beams CRI #1, CRI #2, CRI #3, and CRI #4 sent by the base station. Herein, the base station instructs, in an implicit indication manner, the UE to sweep transmit beams of the base station about the CRI #1, the CRI #2, the CRI #3, and the CRI #4 in a receive beam direction corresponding to the Rx parameter #0.

The UE performs measurement and feedback based on the indication from the base station, that is, feeds back L1-RSRP of a downlink beam (namely, an RS corresponding to each CRI). The base station associates an LOI with a CRI based on the feedback from the UE to obtain a correspondence shown in FIG. 4(b), and sends the correspondence to the UE. Optionally, the base station may directly configure a correspondence between an LOI and a CRI, and send the directly configured correspondence between an LOI and a CRI to the UE.

After the UE receives the correspondence that is sent by the base station and that is shown in FIG. 4(b), the UE may update a correspondence maintained by the UE. The correspondence obtained after the updating by the UE may be a correspondence that is shown in FIG. 4(c) and that is obtained after content of the correspondence in FIG. 4(b) is added to a table shown in FIG. 4(a) and maintained by the UE.

In FIG. 4(c), a spatial parameter of the UE, namely, an Rx parameter #0, may be a measurement quantity that is obtained after a CSI-RS signal represented by a CRI #0 is measured.

Optionally, when the foregoing correspondence needs to be updated later, the base station or the UE may perform update and maintenance in the foregoing manner. The base station may also send an updated correspondence to the UE after the update.

Optionally, the CRI identifier in FIG. 4(a), FIG. 4(b), and FIG. 4(c) may alternatively be identified by a port number, and this is not specifically limited in this embodiment of this application.

Optionally, in FIG. 4(a), FIG. 4(b), or FIG. 4(c), the foregoing correspondence may be a correspondence between an LOI and a beam corresponding to a downlink signal identifier, or may be a correspondence between an LOI and beams corresponding to a plurality of downlink signal identifiers.

Optionally, the base station and the UE may update the correspondence shown in FIG. 4(b) or FIG. 4(c) according to a predefined rule. The predefined rule includes: always associating an LOI directly based on a size of RSRP. For example, an LOT [00] always corresponds to a CRI whose RSRP is the largest.

Optionally, when the correspondence shown in FIG. 4(a), FIG. 4(b), or FIG. 4(c) is not established, the base station and the UE may communicate with each other by using a default beam direction according to a predefined rule. The predefined rule includes: always using a beam that is last fed back by the UE and that has strongest RSRP, or a wide beam used by the UE to access a network.

(1) Method for Managing an Uplink Transmit Beam

An SRS signal is used as an example. UE maintains a correspondence between a transmit beam of the UE, a receive beam of a base station, and an LOI based on an indication from the base station. As shown in FIG. 5(a), an SRI #0 represents an uplink signal identifier, where the uplink signal identifier is also a receive beam of the base station; a Tx parameter #0 represents a spatial parameter, where the spatial parameter is also a transmit beam of the UE: and an LOI uses a relatively small quantity of bits to represent the SRI #0. Optionally, in FIG. 5(a), a PRACH may alternatively be used to substitute for the SRI #0.

Then, the base station instructs the UE to send SRS signals, and the base station measures L1-RSRP of a transmit beam corresponding to each SRS signal. Optionally, the base station may further notify the UE that a spatial QCL relationship exists between beam directions of an SRI #1, an SRI #2, an SRI #3, and an SRI #4 needing to be measured and a beam direction of the SRI #0. Optionally, the UE may also determine beams for sending the SRI #1, the SRI #2, the SRI #3, and the SRI #4.

Optionally, the base station may configure one or more SRS resource groups for the UE. One SRS resource group may include SRS resources corresponding to, for example, {SRI #1. SRI #2, SRI #3, SRI #4}. One or more resource groups may be used to perform uplink beam management. The base station may perform configuration for the UE to send SRSs at same transmission power on all SRS resources within one or more SRS resource groups. The transmission power is power at which the SRS is sent, for example, represented as energy per RE (EPRE).

Optionally, the UE may request configuration of an SRS resource or an SRS resource group from the base station. For example, the UE may feed back a beam switching capability of the UE; and the base station configures, based on a request received from the UE, an SRS transmission time-frequency resource and/or a beam direction in compliance with the capability of the UE, and sends the configuration to the UE.

After measurement, the base station establishes a correspondence between an LOI and a receive beam, and sends the correspondence to the UE. FIG. 5(b) shows the correspondence. Optionally, the base station may directly configure a correspondence between an LOI and an SRI, and send the directly configured correspondence between the LOI and the SRI to the UE.

Figures 5C, 6, 7:
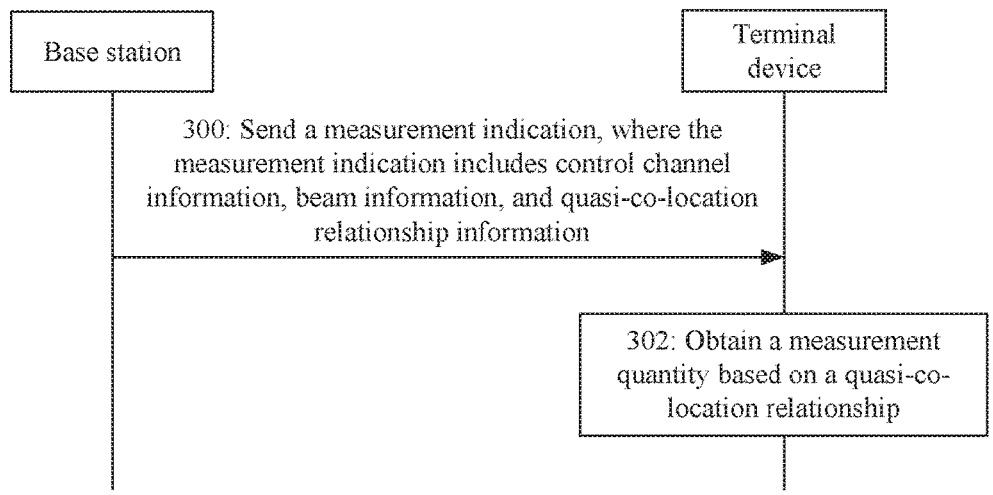
FIG. 5(c) is a schematic diagram of a correspondence between an LOI, an uplink signal identifier, and a spatial parameter, where the correspondence is maintained by UE based on a correspondence that is sent by a base station and that is between an LOI and an uplink signal identifier according to an embodiment of this application.
FIG. 6 is a schematic diagram of a correspondence between an LOI and a related signal identifier when uplink and downlink beams are jointly managed according to an embodiment of this application.
FIG. 7 is a schematic flowchart of an implementation of an applicable quasi-co-location relationship for UE to receive an indication from a base station to perform control channel measurement according to an embodiment of this application.

After the UE receives the correspondence shown in FIG. 5(b) that is sent by the base station, the UE may update the received correspondence to a correspondence maintained by the UE. A correspondence obtained after the update by the UE may be shown in FIG. 5(c).

In FIG. 5(c), a spatial parameter of the UE, namely, a Tx parameter #0, is a measurement quantity that is obtained after an SRS signal represented by an SRI #0 is measured.

Optionally, when the foregoing correspondence needs to be updated later, the base station or the UE may perform update and maintenance in the foregoing process. The base station may send an updated correspondence to the UE after the update.

Optionally, the SRI identifier in FIG. 5(a). FIG. 5(b), or FIG. 5(c) may alternatively be identified by a port number, and this is not specifically limited in this embodiment of this application.

(3) Support for Beam Reciprocity by the UE

When the UE supports beam reciprocity, the UE can ensure implementation of consistency between a receive beam direction and a transmit beam direction. For example, {CRI #0, SRI #0} may be configured as having a spatial QCL relationship, and each pair in {CRI #2, SRI #2}, {CRI #3, SRI #3}, and {CRI #4. SRI #4} may also be configured as having a spatial QCL relationship. In this case, the mapping relationship established during downlink beam management, for example, in FIG. 4(b) or FIG. 4(c), may be used for uplink beam indication. Certainly, the mapping relationship established during uplink beam management, for example, in FIG. 5(b) or FIG. 5(c), may be used for downlink beam indication.

Optionally, uplink beam management and downlink beam management may be combined, and the base station and/or the UE may establish a mapping relationship between an LOI, a CRI/SRI, a Tx/Rx beam of the base station, and an Rx/Tx beam of the UE. An implementation of this mapping relationship may be shown in FIG. 6.

When the base station sends a beam indication to the UE by using an LOI, downlink beam management is performed on the UE, that is, the correspondence shown in FIG. 4(c) is maintained; and uplink beam management is also performed, that is, the correspondence shown in FIG. 5(c) is maintained. In addition, when the UE also supports beam reciprocity and the UE receives information, sent by the base station, in which an LOI is used as the beam indication, if the LOI has information of only two bits, the UE cannot determine whether to use the correspondence shown in FIG. 4(c) or the correspondence shown in FIG. 5(c). In step 202, a beam indication that is received by the UE from the base station and that is indicated based on the QCL type 3 may not clearly indicate a transmit beam or a receive beam, causing an error. This is because the LOI is represented by using bits, and does not clearly indicate a transmit beam or a receive beam.

In this embodiment of this application, the UE may determine, in the following two manners, a beam direction indicated by the base station:

Manner 1: When the UE does not support beam reciprocity, the UE determines a specific beam based on beam information indicated by the QCL type 3, for example, in a beam information indication manner in FIG. 3(a).

The base station notifies the UE, by using an indicator (namely, an LOI), of information about a beam for sending a CSI-RS signal. After receiving the LOI sent by the base station, the UE can learn, based on the LOI, that a spatial QCL relationship exists between an antenna port for sending the CSI-RS signal and an antenna port of a previously measured reference signal.

When signaling that is received by the UE and sent by the base station and that includes the QCL type 3 is signaling that controls downlink transmission, the UE can learn, based on an LOI carried in the signaling that controls downlink transmission, that the LOI is a downlink LOI. The UE determines, based on the maintained correspondence in FIG. 4(c), information about a beam for receiving the CSI-RS signal. After receiving the LOI sent by the base station, the UE can learn, based on the LOI, that a spatial QCL relationship exists between an antenna port for sending the CSI-RS signal and an antenna port of a previously measured reference signal. For example, the base station indicates, to the UE by using signaling that controls downlink transmission, that an LOI of the QCL type 3 is 01, and the UE may learn, with reference to the correspondence in FIG. 4(c), that a beam for receiving the CSI-RS signal is a receive beam corresponding to a downlink beam for previously receiving a CRI #2. In addition, the UE can learn, based on the LOI, that a spatial QCL relationship exists between a port for receiving the CSI-RS signal and a port for the receive beam corresponding to the downlink beam for receiving the CRI #2.

Manner 2: When the UE supports beam reciprocity, the UE indicates, based on the QCL type 3, that content used in a beam indication of an uplink beam direction is an indication of a downlink beam pair, or content used in a beam indication of a downlink beam direction is an indication of an uplink beam pair.

It should be noted that, that the UE indicates, based on the QCL type 3, that content used in a beam indication of an uplink beam direction is an indication of a downlink beam pair, or content used in a beam indication of a downlink beam direction is an indication of an uplink beam pair, is implemented based on a pre-configuration. The base station may pre-configure that the UE determines a specific indicated beam direction in a configured manner when receiving a QCL type 3 indication.

Specifically, as shown in FIG. 3(b), information configured by the base station in a QCL type 3 includes {CRI resource, SRS resource} and beam indication information (namely, an LOI). If the UE receives an indication about the QCL type 3 from the base station by using signaling that controls downlink transmission, the UE determines, based on a pre-configuration, that the LOI is a downlink LOI. The UE obtains, based on the received LOI and the correspondence in FIG. 4(c), a CRI # corresponding to the received LOI; and determines, based on a spatial QCL relationship between a CRI resource and an SRS resource in FIG. 3(b), an SRI # corresponding to the CRI #, and determines a transmit beam based on the obtained SRI #.

If the UE receives an indication about the QCL type 3 from the base station by using signaling that controls uplink transmission, the UE determines, based on a pre-configuration, that the LOI is an uplink LOI. The UE obtains, based on the received LOI and the correspondence in FIG. 5(c), an SRI # corresponding to the received LOI; and determines, based on a spatial QCL relationship between a CRI resource and an SRS resource in FIG. 3(b), a CRI # corresponding to the SRI #, and determines a receive beam based on the obtained CRI #.

Optionally, the QCL configuration information sent by the base station to the UE may further indicate that a quasi-colocation relationship exists between a path loss of downlink transmission and a path loss of uplink transmission. As shown in FIG. 3(c), the base station indicates, to the UE by using a QCL type 1, that a quasi-co-location relationship with respect to a path loss exists between a CSI-RS resource and an SRS resource. A configuration manner and an indication manner of a quasi-co-location relationship between a path loss of downlink transmission and a path loss of uplink transmission in FIG. 3(c) may be similar to the configuration manner and the indication manner of the quasi-co-location relationship between an SS port and a CSI-RS resource in FIG. 3(a) or FIG. 3(b), and details are not described again. A configuration manner and an indication manner of a QCL type 3 in FIG. 3(c) may be similar to the configuration manner and the indication manner of the QCL type 3 in FIG. 3(a) or FIG. 3(b), and details are not described again.

Optionally, the UE may obtain a path loss (path loss) of a CSI-RS signal based on beam information indicated by the QCL type 3 and the quasi-co-location relationship between a path loss of downlink transmission and a path loss of uplink transmission in FIG. 3(c). The path loss may be obtained by subtracting receive power from transmit power.

Optionally, the UE may estimate a path loss of uplink transmission by measuring or obtaining an average gain of a CSI-RS.

Optionally, the QCL type 1 in FIG. 3(c) may alternatively be configured as a quasi-co-location relationship that is with respect to a path loss and that is between another downlink signal (for example, a synchronization signal block) and an SRS.

Optionally, the QCL type 1 in FIG. 3(c) may alternatively be configured as a quasi-co-location relationship that is with respect to a path loss and that is between a group of CSI-RS resources and a group of SRS resources.

Optionally, the base station may estimate a path loss between the base station and the UE by jointly using a measured average gain of the SRS and an average gain of the CSI-RS that is fed back by the UE.

Optionally, the base station may further notify the UE of a difference between an estimated path loss of a measured average gain of a CSI-RS and an estimated path loss of a measured average gain of an SRS.

It should be noted that, content in FIG. 3(a), FIG. 3(b), and FIG. 3(c) is optional, and the base station performs related configuration only when a related type of QCL assumption exists between two ports. When a related type of QCL assumption does not exist between two ports, a QCL relationship does not exist by default and a channel parameter of each port needs to be separately measured. Optionally, when the base station configures QCL with respect to an average gain, the QCL type 3 in FIG. 3(a), FIG. 3(b), and FIG. 3(c) is also optional content. During specific implementation, the base station may configure only content about the QCL type 1 and send the content about the QCL type 1 to the UE; and after receiving a QCL type 1 indication sent by the base station, the UE can learn of a QCL relationship with respect to an average gain.

Optionally, in this embodiment of this application, a quantity of bytes used to indicate the QCL type 1 in FIG. 3(a), FIG. 3(b), or FIG. 3(c) is not limited. The quantity of bytes used to indicate the QCL type 1 in FIG. 3(a), FIG. 3(b), or FIG. 3(c) may be two bytes, or three bytes, or a plurality of bytes, and is not specifically limited in this embodiment of this application.

4. Implementation of QCL Related to a Control Channel in an NR System

An implementation of an applicable quasi-co-location relationship for UE to receive an indication from a base station to perform control channel measurement may be shown in FIG. 7. A process of the implementation includes the following steps.

Step 300: The UE receives a measurement indication sent by the base station, where the measurement indication includes control channel information, beam information, and quasi-co-location relationship information.

The control channel information may be a port for sending a control channel DMRS signal, and the control channel DMRS signal is a DMRS used for control channel demodulation. A correspondence exists between the port for sending the control channel DMRS signal and an RE occupied by the control channel DMRS signal. The UE may obtain, based on the port, information such as a time-frequency resource location of a control channel DMRS signal needing to be measured.

The beam information is information about a beam for receiving the control channel information by the UE.

The quasi-co-location relationship information is information about a quasi-co-location relationship between the port for sending the control channel DMRS signal and a port for sending another signal.

For example, a control channel is a PDCCH. The antenna port for sending the control channel DMRS signal (a PDCCH-DMRS) is a port used by the base station to send a PDCCH to the UE; and the beam information is a beam for receiving the PDCCH by the UE, and is also information about a direction in which the UE measures the control channel DMRS.

The beam information includes at least one of the following information: an index of the beam, an index of an antenna port corresponding to the beam, an index of a reference signal corresponding to the beam, a time index of a downlink synchronization signal block, or beam pair link BPL information.

The base station may separately send the control channel information, the beam information, and the quasi-co-location relationship information to the UE by using different types of signaling. Such types of signaling include but are not limited to RRC signaling, MAC-CE signaling, or DCI.

Step 302: The UE obtains a measurement quantity based on the quasi-co-location relationship information sent by the base station.

To be specific, the UE receives, based on the measurement indication sent by the base station, the signal needing to be measured from the receive beam; and obtains, based on the quasi-co-location relationship information, an average gain, delay spread, Doppler spread, Doppler frequency shift, an average delay, or the like of the control channel DMRS signal needing to be measured.

The following describes, by using FIG. 8(a) and FIG. 8(b) as an example, a manner in which the base station configures the measurement indication and a manner in which the UE obtains the measurement quantity. In FIG. 8(a) and FIG. 8(b), description is given by using an example in which a QCL relationship with respect to an average gain exists between a port for sending a control channel DMRS signal needing to be measured and a port for sending a CSI-RS signal. For implementation of a QCL relationship that is with respect to an average gain and that is between the port for sending the control channel DMRS signal needing to be measured and a port for sending another signal, refer to the manners shown in FIG. 8(a) and FIG. 8(b). In addition, for a CSI-RS resource in FIG. 8(a) and FIG. 8(b), refer to description of the CSI-RS resource in FIG. 2, FIG. 3(a), and FIG. 3(b).

In FIG. 8(a), the quasi-co-location relationship information sent by the base station to the UE includes a QCL type 1, a QCL type 2, and a QCL type 3.

The QCL type 1 is used to indicate that a quasi-co-location relationship with respect to an average gain exists between a port for sending a DMRS signal and a port for sending a CSI-RS resource. To be specific, a quasi-co-location relationship with respect to an average gain exists between each port in a DMRS port group and a port for sending a CSI-RS by the base station.

In this embodiment of this application, a DMRS port group includes one or more ports for sending a DMRS signal. In a specific implementation, a correspondence between each DMRS port group and a port for sending a DMRS signal is as follows:

DMRS port group 1: D1 to D4
DMRS port group 2: D5 to D8
DMRS port group 1-1: D1 and D2
DMRS port group 1-2: D3 and D4
DMRS port group 2-1: D5 and D6
DMRS port group 2-2: D7 and D8

The QCL type 2 is used to indicate a quasi-co-location relationship with respect to delay spread, Doppler spread, Doppler frequency shift, an average delay, or the like exists between the port for sending the control channel DMRS signal and the port for sending the CSI-RS resource. When receiving configuration information that is sent by the base station and that is about the QCL type 2, the UE can learn, based on the QCL relationship that is with respect to an average gain and that is between the port for sending the control channel DMRS signal and the port for sending the CSI-RS resource, that a QCL relationship with respect to delay spread, Doppler spread, Doppler frequency shift, an average delay, or the like exists between the port for sending the control channel DMRS signal and the port for sending the CSI-RS resource. In this way, the UE may use delay spread, Doppler spread, Doppler frequency shift, or an average delay of a CSI-RS signal as delay spread, Doppler spread, Doppler frequency shift, or an average delay of the control channel DMRS signal based on the information indicated by the QCL type 2, where the CSI-RS signal is identified by a CSI-RS resource corresponding to a group in which the port for sending the control channel DMRS signal by the base station resides.

For the foregoing configuration manner of the QCL type 2, the UE may obtain, based on grouping information about the QCL type 1 and the port for sending the control channel DMRS signal, information about a quasi-co-location relationship with respect to delay spread, Doppler spread, Doppler frequency shift, an average delay, or the like between the control channel DMRS signal and the CSI-RS signal, thereby reducing a resource to be occupied when the base station sends signaling to the UE and reducing signaling resource consumption.

The QCL type 3 is used to indicate, to the UE, information about a beam for receiving control channel information. The UE can obtain, based on the received beam information, a spatial QCL relationship between the antenna port for sending the control channel DMRS signal and the port for sending the CSI-RS resource. The base station may notify the UE of the receive beam by using an indicator. Correspondingly, the base station needs to send information about the control channel DMRS signal to the UE on a transmit beam corresponding to the receive beam. In other words, a transmit beam of the base station corresponds to a receive beam of the UE, and the UE needs to receive the control channel signal based on the receive beam indicated by the base station.

After receiving configuration information sent by the base station, the UE can learn, based on the QCL type 3, that a spatial QCL relationship exists between the antenna port for sending the control channel DMRS signal and the port for sending the CSI-RS resource; and receive, from the receive beam indicated by the QCL type 3, the control channel DMRS signal sent by the base station. Then the UE learns, based on configuration information of the QCL type 1, that a QCL relationship with respect to an average gain exists between the port for sending the control channel DMRS signal and the port for sending the CSI-RS resource. In this way, the UE may first determine, based on the configuration information indicated by the QCL type 1, a group in which the port for sending the control channel DMRS signal by the base station resides, and then use an average gain of a CSI-RS resource corresponding to the group in which the port for sending the control channel DMRS signal resides as an average gain of the control channel DMRS signal. Then, the UE learns, based on the information indicated by the QCL type 2 and the QCL relationship that is with respect to an average gain and that is between the port for sending the control channel DMRS signal and the port for sending the CSI-RS resource, that a QCL relationship with respect to delay spread, Doppler spread, Doppler frequency shift, an average delay, or the like exists between the port for sending the control channel DMRS signal and the port for sending the CSI-RS resource. The UE uses delay spread, Doppler spread, Doppler frequency shift, or an average delay of a CSI-RS signal as delay spread, Doppler spread, Doppler frequency shift, or an average delay of the control channel DMRS signal based on the information indicated by the QCL type 2, where the CSI-RS signal is identified by the CSI-RS resource corresponding to the group in which the port for sending the control channel DMRS signal resides.

Likewise, when the UE maintains both the correspondence shown in FIG. 4(c) and the correspondence shown in FIG. 5(c), the UE also supports beam reciprocity, and the UE receives information, sent by the base station, in which an LOI is used as a beam indication, if the LOI has information of only two bits, the UE cannot determine whether to use the correspondence shown in FIG. 4(c) or the correspondence shown in FIG. 5(c). In step 302, a beam indication that is received by the UE from the base station and that is indicated based on the QCL type 3 may not clearly indicate a transmit beam or a receive beam, causing an error. This is because the LOI is represented by using bits, and does not clearly indicate a transmit beam or a receive beam.

In this embodiment of this application, the UE may determine, in the following two manners, a beam direction indicated by the base station:

Manner 1: When the UE does not support beam reciprocity, the UE determines a specific beam based on beam information indicated by the QCL type 3, for example, in a beam information indication manner in FIG. 8(a).

The base station notifies the UE, by using an indicator (namely, an LOI), of information about a beam for sending a control channel DMRS signal. After receiving the LOI sent by the base station, the UE can learn, based on the LOI, that a spatial QCL relationship exists between an antenna port for sending the control channel DMRS signal and an antenna port of a previously measured reference signal.

When signaling that is received by the UE and sent by the base station and that includes the QCL type 3 is signaling that controls downlink transmission, the UE can learn, based on an LOI carried in the signaling that controls downlink transmission, that the LOI is a downlink LOI. The UE determines, based on the maintained correspondence in FIG. 4(c), information about a beam for receiving the control channel DMRS signal. After receiving the LOI sent by the base station, the UE can learn, based on the LOI, that a spatial QCL relationship exists between an antenna port for sending the control channel DMRS signal and an antenna port of a previously measured reference signal. For example, the base station indicates, to the UE by using signaling that controls downlink transmission, that an LOI of the QCL type 3 is 01, and the UE may learn, with reference to the correspondence in FIG. 4(c), that a beam for receiving the control channel DMRS signal is a receive beam corresponding to a downlink beam for previously receiving a CRI #2. In addition, the UE can learn, based on the LOI, that a spatial QCL relationship exists between the port for receiving the control channel DMRS signal and a port for the receive beam corresponding to the downlink beam for receiving the CRI #2.

Manner 2: When the UE supports beam reciprocity, the UE indicates, based on the QCL type 3, that content used in a beam indication of an uplink beam direction is an indication of a downlink beam pair, or content used in a beam indication of a downlink beam direction is an indication of an uplink beam pair.

It should be noted that, that the UE indicates, based on the QCL type 3, that content used in a beam indication of an uplink beam direction is an indication of a downlink beam pair, or content used in a beam indication of a downlink beam direction is an indication of an uplink beam pair, is implemented based on a pre-configuration. The base station may pre-configure that the UE determines a specific indicated beam direction in a configured manner when receiving a QCL type 3 indication.

Specifically, as shown in FIG. 8(b), information configured by the base station in a QCL type 3 includes (CRI resource, SRS resource) and beam indication information (namely, an LOI). If the UE receives an indication about the QCL type 3 from the base station by using signaling that controls downlink transmission, the UE determines, based on a pre-configuration, that the LOI is a downlink LOI. The UE obtains, based on the received LOI and the correspondence in FIG. 4(c), a CRI # corresponding to the received LOI; and determines, based on a spatial QCL relationship between a CRI resource and an SRS resource in FIG. 8(b), an SRI # corresponding to the CRI #, and determines a transmit beam based on the obtained SRI #.

If the UE receives an indication about the QCL type 3 from the base station by using signaling that controls uplink transmission, the UE determines, based on a pre-configuration, that the LOI is an uplink LOI. The UE obtains, based on the received LOI and the correspondence in FIG. 5(c), an SRI # corresponding to the received LOI; and determines, based on a spatial QCL relationship between a CRI resource and an SRS resource in FIG. 8(b), a CRI # corresponding to the SRI #, and determines a receive beam based on the obtained CRI #.

It should be noted that, content in FIG. 8(a) and FIG. 8(b) is optional, and the base station performs related configuration only when a related type of QCL assumption exists between two ports. When a related type of QCL assumption does not exist between two ports, a QCL relationship does not exist by default and a channel parameter of each port needs to be separately measured.

In this embodiment of this application, a manner in which the base station sends the QCL type 1, the QCL type 2, and the QCL type 3 to the UE is not limited during specific implementation. For example, a manner in which the base station sends the QCL type 1 may be: adding a field to signaling (for example, RRC signaling) to be sent to the UE, where the field indicates information about a QCL relationship between a control channel DMRS port group and a CSI-RS resource. A manner in which the base station sends the QCL type 2 may be: adding a field to signaling (for example, MAC-CE signaling) to be sent to the UE, where the field indicates that a QCL relationship with respect to delay spread, Doppler spread, Doppler frequency shift, an average delay, or the like exists between a control channel DMRS port group and a CSI-RS resource.

Further, during specific implementation, the quasi-co-location relationship configured by using the QCL type 2 is based on an assumption that a plurality of signals (a control channel DMRS signal and data of UE 1, and a control channel DMRS signal and data of UE 2) are sent from a same panel, and the plurality of signals are sent on a same RE, where mutual interference may be caused. In this case, the UE may assume that a control channel is not mapped onto an RE occupied by a DMRS port in a DMRS port group of the QCL type 2. Optionally, the base station may directly notify the UE whether a control channel is mapped onto an RE occupied by a DMRS port in a DMRS port group of the QCL type 2.

Figure 10:
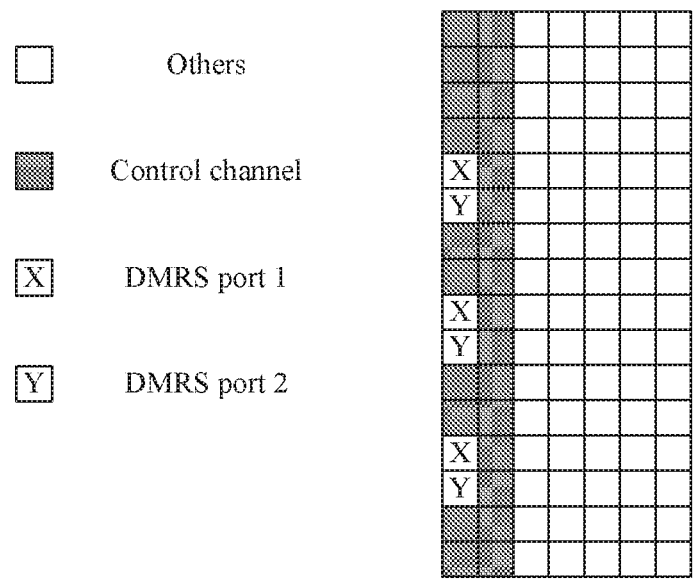
FIG. 10 is a schematic diagram of time-frequency resource allocation according to an embodiment of this application.

For example, when UE 1 and UE 2 are on a same panel, control information sent by the base station to the UE 1 is shown in FIG. 9(a) and FIG. 9(b). According to FIG. 9(b), ports for sending a PDSCH DMRS to the UE 1 include D1 and D5, and a port for sending a PDCCH DMRS to the UE 1 is D1. According to FIG. 9(a), D1 and D2 belong to a same group with respect to a QCL type 2, namely, a group 1-1. Because a fixed binding relationship exists between a port number and a time-frequency resource, a control channel is not mapped at a location of an RE corresponding to the UE 2 when the base station sends a signal to the UE 1. When the UE 1 receives an indication sent by the base station, a control channel is not mapped onto an RE corresponding to a port D2 by default. Certainly, the base station may directly indicate, to the UE 1, that data is not mapped onto the RE corresponding to the port D2. Correspondingly, when the UE 1 performs RE resource demodulation, the location of the RE corresponding to the UE 2 is considered as having no data, and therefore the location of the RE corresponding to the UE 2 is no longer demodulated. For example, FIG. 10 is a schematic diagram of time-frequency resource allocation. In FIG. 10. X represents an RE, onto which a reference signal (a DMRS signal) of a control channel is mapped, of UE 1; and Y represents an RE, onto which a reference signal (a DMRS signal) of a control channel is mapped, of UE 2. When the UE 1 receives control channel information sent by a base station, a control channel of the UE 1 is not mapped onto the RE corresponding to Y by default.

Certainly, when a panel serves only one UE, a control channel may also be mapped at the location of the RE corresponding to the port D2. For example, in FIG. 10, the RE corresponding to Y is also used to map a control channel of the UE.

Optionally, if a QCL relationship exists between parameters, with respect to the foregoing three types, of the DMRS and a same reference signal such as a CSI-RS resource 1, the foregoing three indications may be replaced by one indication, plus a 1-bit identifier to represent a single piece of signaling that indicates the three types of QCL relationships.

For example, identification is performed by using only beam indication information plus a 1-byte identifier.

Optionally, when the base station configures QCL with respect to an average gain, the QCL type 3 in FIG. 8(a) and FIG. 8(b) is also optional content. During specific implementation, the base station may configure only content about the QCL type 1 and send the content about the QCL type 1 to the UE: and after receiving a QCL type 1 indication sent by the base station, the UE can learn of a QCL relationship with respect to an average gain.

In an optional implementation, when configuring QCL with respect to delay spread, Doppler spread, Doppler frequency shift, or an average delay, the base station may configure only content about the QCL type 2 in FIG. 8(a) and FIG. 8(b); and after receiving a QCL type 2 indication sent by the base station, the UE can learn of the QCL relationship with respect to delay spread, Doppler spread, Doppler frequency shift, or an average delay.

Optionally, in this embodiment of this application, a quantity of bytes used to indicate the QCL type 1 or the QCL type 2 in FIG. 8(a) or FIG. 8(b) is not limited. The quantity of bytes used to indicate the QCL type 1 or the QCL type 2 in FIG. 8(a) or FIG. 8(b) may be two bytes, or three bytes, or a plurality of bytes, and is not specifically limited in this embodiment of this application.

5. Implementation of QCL Related to a Data Channel in an NR System

Figure 11:
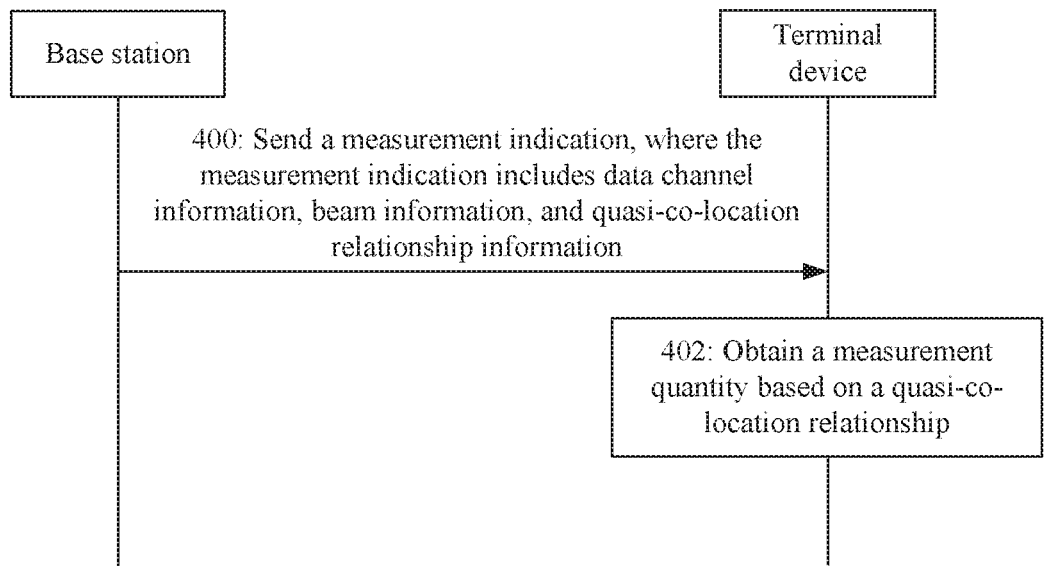
FIG. 11 is a schematic flowchart of an implementation of an applicable quasi-co-location relationship for UE to receive an indication from a base station to perform data channel measurement according to an embodiment of this application.

An implementation of an applicable quasi-co-location relationship for UE to receive an indication from a base station to perform data channel measurement may be shown in FIG. 11. A process of the implementation includes the following steps.

Step 400: The UE receives a measurement indication sent by the base station, where the measurement indication includes data channel information, beam information, and quasi-co-location relationship information.

The data channel information may be a port for sending a data channel DMRS signal, and the data channel DMRS signal is a DMRS used for data channel demodulation. A correspondence exists between the port for sending the data channel DMRS signal and an RE occupied by the data channel DMRS signal. The UE may obtain, based on the antenna port, information such as a time-frequency resource location of a data channel DMRS signal needing to be measured.

In NR, it is assumed that a port for sending a data channel is consistent with a port for sending a data channel DMRS signal. Therefore, the base station may notify the UE of a port for sending a data channel by notifying the UE of a port for sending a data channel DMRS signal. Optionally, the notifying, by the base station, the UE of a port for sending a data channel DMRS signal may be implemented by using an antenna port related field in DCI, for example, an Antenna port(s), scrambling identity and number of layers indication field. Optionally, the base station may indicate, to the UE by reusing a QCL related field in the DCI, for example, a PDSCH RE Mapping and Quasi-Co-Location Indicator field, information about a quasi-co-location relationship group in which the port for sending the data channel DMRS signal resides. When receiving the DCI including this field, the UE can learn which antenna ports are used to transmit data and learn of information about a quasi-co-location relationship group in which a DMRS port for transmitting data resides.

The beam information is information about a beam for receiving the data channel information by the UE.

The quasi-co-location relationship information is information about a quasi-co-location relationship between the port for sending the data channel DMRS signal and a port for sending another signal.

For example, a data channel is a PDSCH. The antenna port for sending the data channel DMRS signal (a PDSCH-DMRS) is a port used by the base station to send a PDSCH to the UE; and the beam information is information about a beam for receiving the PDSCH by the UE.

The beam information includes at least one of the following information: an index of the beam, an index of an antenna port corresponding to the beam, an index of a reference signal corresponding to the beam, a time index of a downlink synchronization signal block, or beam pair link BPL information.

The base station may separately send the data channel information, the beam information, and the quasi-co-location relationship information to the UE by using different types of signaling. Such types of signaling include but are not limited to RRC signaling, MAC-CE signaling, or DCI.

Step 402: The UE obtains a measurement quantity based on the quasi-co-location relationship information sent by the base station.

Optionally, the UE may receive, based on the measurement indication sent by the base station, the signal needing to be measured from the receive beam; and obtain, based on the quasi-co-location relationship information, an average gain, delay spread, Doppler spread, Doppler frequency shift, an average delay, or the like of the data channel DMRS signal needing to be measured.

The following describes, by using FIG. 12(a) and FIG. 12(b) as an example, a manner in which the base station configures the measurement indication and a manner in which the UE obtains the measurement quantity. In FIG. 12(a) and FIG. 12(b), description is given by using an example in which a QCL relationship with respect to an average gain exists between a port for sending a data channel DMRS signal needing to be measured and a port for sending a CSI-RS signal. For implementation of a QCL relationship that is with respect to an average gain and that is between the port for sending the data channel DMRS signal needing to be measured and a port for sending another signal, refer to the manners shown in FIG. 12(a) and FIG. 12(b). In addition, for a CSI-RS resource in FIG. 12(a) or FIG. 12(b), refer to description of the CSI-RS resource in FIG. 2, FIG. 3(a), or FIG. 3(b).

In FIG. 12(a), the quasi-co-location relationship information sent by the base station to the UE includes a QCL type 1, a QCL type 2, and a QCL type 3.

The QCL type 1 is used to indicate that a quasi-co-location relationship with respect to an average gain exists between a port for sending a data channel DMRS signal and a port for sending a CSI-RS resource. In other words, a quasi-co-location relationship with respect to an average gain exists between each port in a DMRS port group and a port for sending a CSI-RS by the base station. Optionally, the base station may notify, by using an Antenna port(s), scrambling identity and number of layers indication field in DCI, the UE of a port for sending a data channel; and notify, by using a PDSCH RE Mapping and Quasi-Co-Location Indicator field in the DCI, the UE whether the port for sending the data channel is in a DMRS port group 1 or a DMRS port group 2 in FIG. 12(a).

The QCL type 2 is used to indicate a quasi-co-location relationship with respect to delay spread, Doppler spread, Doppler frequency shift, or an average delay exists between the port for sending the data channel DMRS signal and the port for sending the CSI-RS resource. When receiving configuration information that is sent by the base station and that is about the QCL type 2, the UE can learn, based on the QCL relationship that is with respect to an average gain and that is between the port for sending the data channel DMRS signal and the port for sending the CSI-RS resource, that a QCL relationship with respect to delay spread, Doppler spread, Doppler frequency shift, an average delay, or the like exists between the port for sending the data channel DMRS signal and the port for sending the CSI-RS resource. In this way, the UE may use delay spread, Doppler spread, Doppler frequency shift, or an average delay of a CSI-RS resource as delay spread, Doppler spread, Doppler frequency shift, or an average delay of the data channel DMRS signal based on the information indicated by the QCL type 2, where the CSI-RS resource corresponds to a group in which the port for sending the data channel DMRS signal by the base station resides. For this configuration manner that is based on the QCL type 2, the UE may obtain, based on grouping information about the QCL type 1 and the port for sending the data channel DMRS signal, information about a quasi-co-location relationship with respect to delay spread, Doppler spread, Doppler frequency shift, an average delay, or the like between the data channel DMRS signal and a CSI-RS signal, thereby reducing a resource to be occupied when the base station sends signaling to the UE and reducing signaling resource consumption.

The QCL type 3 is used to indicate, to the UE, information about a beam for receiving data channel information. The UE can obtain, based on the received beam information, a spatial QCL relationship between the antenna port for sending the data channel DMRS signal and the port for sending the CSI-RS resource. The base station may notify the UE of the receive beam by using an indicator. Correspondingly, the base station needs to send information about the data channel DMRS signal to the UE on a transmit beam corresponding to the receive beam. In other words, a transmit beam of the base station corresponds to a receive beam of the UE, and the UE needs to receive the data channel signal based on the receive beam indicated by the base station. Optionally, the base station may send configuration information of the QCL type 1 to the UE by using a beam indication field in DCI.

Likewise, when the UE maintains both the correspondence shown in FIG. 4(c) and the correspondence shown in FIG. 5(c), the UE also supports beam reciprocity, and the UE receives information, sent by the base station, in which an LOT is used as a beam indication, if the LOI has information of only two bits, the UE cannot determine whether to use the correspondence shown in FIG. 4(c) or the correspondence shown in FIG. 5(c). In step 402, a beam indication that is received by the UE from the base station and that is indicated based on the QCL type 3 may not clearly indicate a transmit beam or a receive beam, causing an error. This is because the LOI is represented by using bits, and does not clearly indicate a transmit beam or a receive beam.

In this embodiment of this application, the UE may determine, in the following two manners, a beam direction indicated by the base station:

Manner 1: When the UE does not support beam reciprocity, the UE determines a specific beam based on beam information indicated by the QCL type 3, for example, in a beam information indication manner in FIG. 12(a).

The base station notifies the UE, by using an indicator (namely, an LOI), of information about a beam for sending a data channel DMRS signal. After receiving the LOT sent by the base station, the UE can learn, based on the LOI, that a spatial QCL relationship exists between an antenna port for sending the data channel DMRS signal and an antenna port of a previously measured reference signal.

When signaling that is received by the UE and sent by the base station and that includes the QCL type 3 is downlink control signaling, the UE can learn, based on an LOI carried in the downlink control signaling, that the LOI is a downlink LOI. The UE determines, based on the maintained correspondence in FIG. 4(c), information about a beam for receiving the data channel DMRS signal. After receiving the LOI sent by the base station, the UE can learn, based on the LOI, that a spatial QCL relationship exists between an antenna port for sending the data channel DMRS signal and an antenna port of a previously measured reference signal. For example, the base station indicates, to the UE by using downlink control signaling, that an LOI of the QCL type 3 is 01, and the UE may learn, with reference to the correspondence in FIG. 4(c), that a beam for receiving the data channel DMRS signal is a receive beam corresponding to a downlink beam for previously receiving a CRI #2. In addition, the UE can learn, based on the LOI, that a spatial QCL relationship exists between the port for receiving the data channel DMRS signal and a port for the receive beam corresponding to the downlink beam for receiving the CRI #2.

Manner 2: When the UE supports beam reciprocity, the UE indicates, based on the QCL type 3, that content used in a beam indication of an uplink beam direction is an indication of a downlink beam pair, or content used in a beam indication of a downlink beam direction is an indication of an uplink beam pair.

Likewise, the base station may pre-configure that the UE determines a specific indicated beam direction in a configured manner when receiving a QCL type 3 indication.

Specifically, as shown in FIG. 12(b), information configured by the base station in a QCL type 3 includes (CRI resource, SRS resource) and beam indication information (namely, an LOI). If the UE receives an indication about the QCL type 3 from the base station by using downlink control signaling, the UE determines, based on a pre-configuration, that the LOI is a downlink LOI. The UE obtains, based on the received LOI and the correspondence in FIG. 4(c), a CRI # corresponding to the received LOI; and determines, based on a spatial QCL relationship between a CRI resource and an SRS resource in FIG. 12(b), an SRI # corresponding to the CRI #, and determines a transmit beam based on the obtained SRI #.

If the UE receives an indication about the QCL type 3 from the base station by using uplink control signaling, the UE determines, based on a pre-configuration, that the LOI is an uplink LOI. The UE obtains, based on the received LOI and the correspondence in FIG. 5(c), an SRI # corresponding to the received LOI; and determines, based on a spatial QCL relationship between a CRI resource and an SRS resource in FIG. 12(b), a CRI # corresponding to the SRI #, and determines a receive beam based on the obtained CRI #.

It should be noted that, content in FIG. 12(a) and FIG. 12(b) is optional, and the base station performs related configuration only when a related type of QCL assumption exists between two ports. When a related type of QCL assumption does not exist between two ports, a QCL relationship does not exist by default and a channel parameter of each port needs to be separately measured.

In this embodiment of this application, a manner in which the base station sends the QCL type 1, the QCL type 2, and the QCL type 3 to the UE is not limited during specific implementation. For example, a manner in which the base station sends the QCL type 1 may be: adding a field to signaling (for example, RRC signaling) to be sent to the UE, where the field indicates information about a QCL relationship between a data channel DMRS port group and a CSI-RS resource. A manner in which the base station sends the QCL type 2 may be: adding a field to signaling (for example, MAC-CE signaling) to be sent to the UE, where the field indicates that a QCL relationship with respect to delay spread, Doppler spread, Doppler frequency shift, an average delay, or the like exists between a data channel DMRS port group and a CSI-RS resource.

Further, during specific implementation, the quasi-co-location relationship configured by using the QCL type 2 is based on an assumption that a plurality of signals (a data channel DMRS signal and data of UE 1, and a data channel DMRS signal and data of UE 2) are sent from a same panel, and the plurality of signals are sent on a same RE, where mutual interference may be caused. In this case, the UE may assume that a data channel is not mapped onto an RE occupied by a data channel DMRS port in a data channel DMRS port group of the QCL type 2. Optionally, the base station may directly notify the UE whether a control channel is mapped onto an RE occupied by a data channel DMRS port in a data channel DMRS port group of the QCL type 2.

Figure 13A:
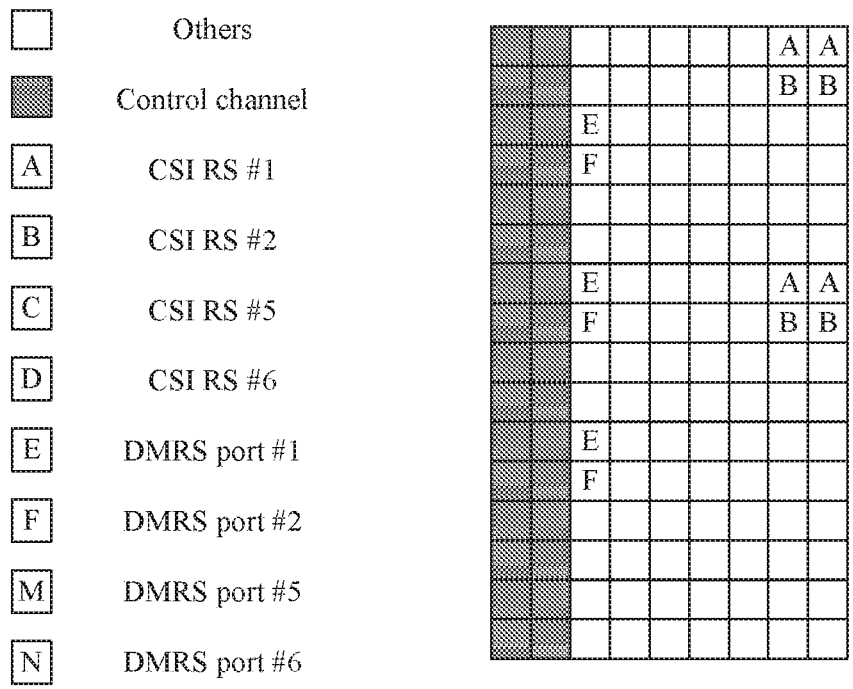
FIG. 13(a) is a schematic diagram of time-frequency resource allocation when a base station 1 sends a data channel to UE 1 according to an embodiment of this application.
Figure 13B:
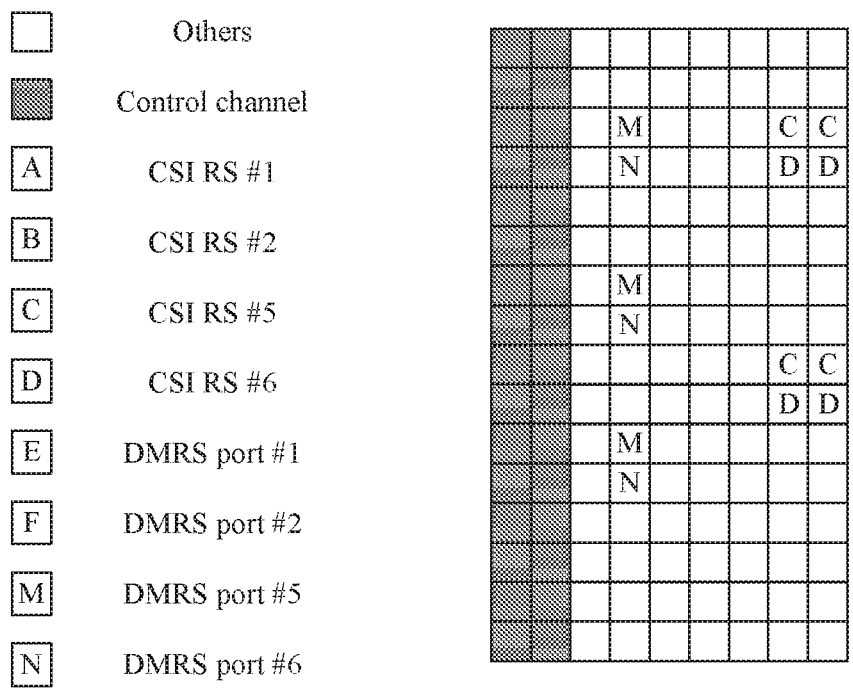
FIG. 13(b) is a schematic diagram of time-frequency resource allocation when a base station 2 sends a data channel to UE 1 according to an embodiment of this application.

For example, when UE 1 and UE 2 are on a same panel, a data channel sent by a base station 1 to the UE 1 is shown in FIG. 13(a): and a data channel sent by a base station 2 to the UE 1 is shown in FIG. 13(b). In FIG. 13(a) and FIG. 13(b), A represents an RE corresponding to a CSI-RS #1, namely, a CRI #1; B represents an RE corresponding to a CSI-RS #2, namely, a CRI #2: C represents an RE corresponding to a CSI-RS #5, namely, a CRI #5; D represents an RE corresponding to a CSI-RS #6, namely, a CRI #6: E represents an RE of a DMRS port 1: F represents an RE of a DMRS port 2: M represents an RE of a DMRS port 5; and N represents an RE of a DMRS port 6.

Because a fixed binding relationship exists between a port number and a time-frequency resource, a data channel is not mapped at a location of an RE corresponding to the UE 2 when the base station 1 sends a signal to the UE 1. When the UE 1 receives an indication sent by the base station 1, a data channel is not mapped onto an RE corresponding to a port D2 by default. Certainly, the base station may directly indicate, to the UE 1, that data is not mapped onto the RE corresponding to the port D2. Correspondingly, when the UE 1 performs RE resource demodulation, the location of the RE corresponding to the UE 2 is considered as having no data, and therefore the location of the RE corresponding to the UE 2 is no longer demodulated. For example, in FIG. 13(a), it is assumed that the port 1 corresponds to the UE 1, and the port 1 and the port 2 are in a same data channel DMRS port group; and when the UE 1 receives data channel information sent by the base station 1, a data channel is not mapped onto the RE corresponding to F by default. In FIG. 13(b), it is assumed that the port 5 corresponds to the UE 1, and the port 5 and the port 6 are in a same data channel DMRS port group; and when the UE 1 receives data channel information sent by the base station 2, a data channel is not mapped onto the RE corresponding to N by default.

In addition, as shown in FIG. 12(a) or FIG. 12(b), there is a QCL relationship of the QCL type 2 between the CRI #1 and the CRI #2, and the base station 1 does not map data to RE locations corresponding to the CRI #1 and the CRI #2 any longer. Likewise, the base station 2 does not map data to RE locations corresponding to the CRI #5 and the CRI #6 any longer.

In addition, there is no QCL relationship of the QCL type 1 between the CRI #1 and the CRI #2, and between the CRI #5 and the CRI #6. When the base station 1 performs data mapping, the base station 1 may map data to the RE locations corresponding to the CRI #5 and the CRI #6. Correspondingly, when the base station 2 performs data mapping, the base station 2 may map data to the RE locations corresponding to the CRI #1 and the CRI #2.

Optionally, when the base station configures QCL with respect to an average gain, the QCL type 3 in FIG. 12(a) and FIG. 12(b) is also optional content. During specific implementation, the base station may configure only content about the QCL type 1 and send the content of the QCL type 1 to the UE; and after receiving a QCL type 1 indication sent by the base station, the UE can learn of a QCL relationship with respect to an average gain.

In an optional implementation, when configuring QCL with respect to delay spread, Doppler spread, Doppler frequency shift, or an average delay, the base station may configure only content about the QCL type 2 in FIG. 12(a) or FIG. 12(b); and after receiving a QCL type 2 indication sent by the base station, the UE can learn of the QCL relationship with respect to delay spread, Doppler spread, Doppler frequency shift, or an average delay. Optionally, in this embodiment of this application, a quantity of bytes used to indicate the QCL type 1 or the QCL type 2 in FIG. 12(a) or FIG. 12(b) is not limited. The quantity of bytes used to indicate the QCL type 1 or the QCL type 2 in FIG. 12(a) or FIG. 12(b) may be two bytes, or three bytes, or a plurality of bytes, and is not specifically limited in this embodiment of this application.

6. Manner of Determining a PUCCH Resource in LTE

For a PUCCH in a specific format (for example, a format 1a/1b), UE determines a location of an uplink PUCCH resource by using a minimum CCE number of a downlink PDCCH. For example, a location of a PUCCH resource may be determined by using the following equation (Equation) 1:

$$n_{PUCCH}^{(1,\tilde{p}0)} = n_{CCE} + N_{PUCCH}^{(1)} \qquad \text{Equation 1:}$$

where $n_{PUCCH}^{(1,\tilde{p}0)}$ represents a location of a PUCCH resource, a superscript (1) represents a format 1, p0 represents an antenna port 0, $n_{CCE}$ represents a minimum CCE number of a PDCCH, and $N_{PUCCH}^{(1)}$ represents a quantity notified by using RRC signaling.

The $n_{PUCCH}^{(1,\tilde{p}0)}$ obtained by using the equation 1 may be used as an input of the following equation 2, to determine a physical resource block (PRB) location for transmitting a PUCCH.

$$n_{PRB}(i) = \begin{cases} m'(j)/2 & \text{if } m'(j)\bmod 2 = 0 \\ N_{RB}^{UL} - 1 - \lfloor m'(j)/2 \rfloor & \text{if } m'(j)\bmod 2 = 1 \end{cases} \qquad \text{Equation 2}$$

$$m'(j) = \begin{cases} m & \text{if } j \bmod 2 = 0 \\ m+1 & \text{if } j \bmod 2 = 1 \text{ and } m \bmod 2 = 0 \\ m-1 & \text{if } j \bmod 2 = 1 \text{ and } m \bmod 2 = 1 \end{cases}$$

$$j = \left\lfloor \frac{i}{N_{NB}^{ch,UL}} \right\rfloor$$

$$i_0 \le i \le i_0 + N_{abs}^{PUCCH} - 1$$

where $n_{PRB}^{(i)}$ is a PRB location of a PUCCH resource, $i_0$ is a subframe number of the first uplink subframe used for transmitting a PUCCH, $N_{RB}^{UL}$ is a quantity of uplink RBs, $N_{RB}^{ch,UL}$ is a quantity of consecutive subframes of the PUCCH or a PUSCH before frequency hopping, $N_{abs}^{PUCCH}$ is a quantity of consecutive subframes of the PUCCH, and m is related to a format of the PUCCH. For example, for formats 1, 1a, and 1b, m may be obtained by using an equation 3.

$$m = \begin{cases} N_{RB}^{(2)} & \text{if } n_{PUCCH}^{(1,\tilde{p})} < c \cdot N_{cs}^{(1)} / \Delta_{shift}^{PUCCH} \\ \left\lfloor \frac{n_{PUCCH}^{(1,\tilde{p})} - c \cdot N_{cs}^{(1)} / \Delta_{shift}^{PUCCH}}{c \cdot N_{sc}^{RB} / \Delta_{shift}^{PUCCH}} \right\rfloor + & \text{otherwise} \\ N_{RB}^{(2)} + \left\lceil \frac{N_{cs}^{(1)}}{8} \right\rceil \end{cases} \quad \text{Equation 3}$$

$$c = \begin{cases} 3 & \text{normal cyclic prefix} \\ 2 & \text{extended cyclic prefix} \end{cases}$$

where $N_{sc}^{RB}$ is 12 in LTE, that is, one RB has 12 subcarriers: and all the other parameters are configured by using RRC signaling.

A beam-based communications system, for example, 5G NR, may support both PDCCH transmission based on a plurality of beams and PUCCH transmission based on a plurality of beams. In this case, a problem may occur when UE estimates a location of an uplink PUCCH resource by using a CCE number of a downlink PDCCH. For example, when a PDCCH is sent by using a plurality of beams, CCEs included in the PDCCH may vary, but an uplink PUCCH is transmitted by using a single beam. There are two different values for $n_{CCE}$ in the foregoing equation 1 $n_{PUCCH}^{(1,\tilde{p}_0)}=n_{CCE}+N_{PUCCH}^{(1)}$, but only one PUCCH resource $N_{PUCCH}^{(1)}$ should be expected, thereby causing a collision.

The embodiments of this application provide a communication method and a communications device, to resolve the collision by using a predefined rule or a configuration of a base station and an indication from the base station, so that UE can correctly process a correspondence between a PDCCH and a PUCCH.

The following describes the communication method provided in an embodiment of this application by using an example in which there are two downlink PDCCHs, namely, a PDCCH #1 and a PDCCH #2, the PDCCH #1 and the PDCCH #2 respectively come from a downlink beam #1 and a downlink beam #2, and the first CCE numbers of the PDCCH #1 and PDCCH #2 are respectively $n_{CCE\ \#1}$, $n_{CCE\ \#2}$.

Figure 14:
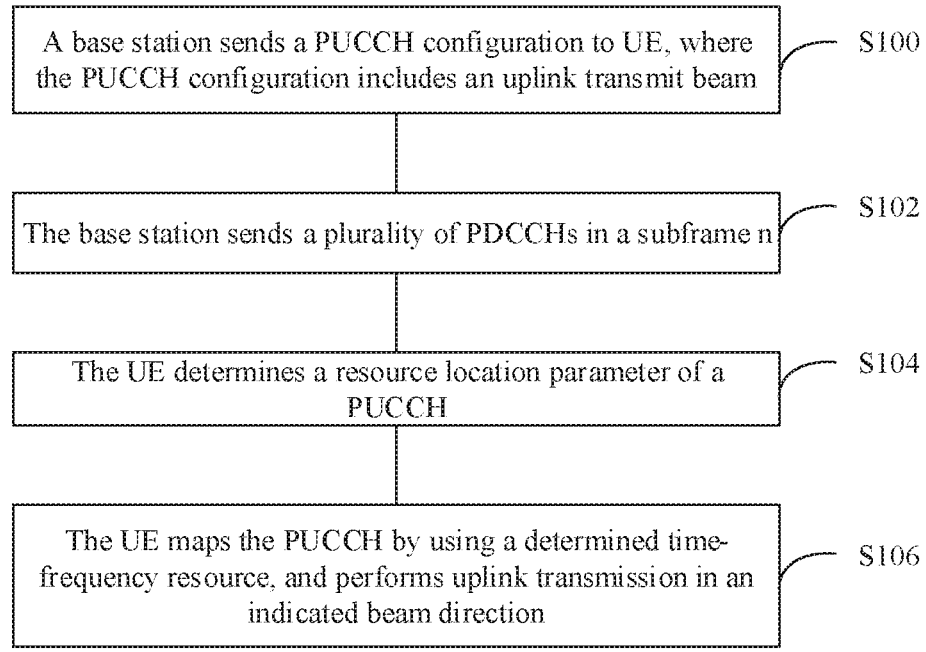
FIG. 14 is a schematic flowchart of a communication method for determining a resource location parameter of a PUCCH according to an embodiment of this application.

FIG. 14 is a schematic flowchart of another communication method according to an embodiment of this application. The method includes the following steps.

Step S100: A base station sends a PUCCH configuration to UE, where the PUCCH configuration includes information about an uplink transmit beam.

The uplink beam may be represented by an uplink beam #1.

Step S102: The base station sends a plurality of PDCCHs in a subframe n.

Step S104: The UE determines $n_{CCE\ \#1}$, $n_{CCE\ \#2}$ and determines a resource location parameter of a PUCCH.

Optionally, a manner in which the UE determines the resource location parameter of the PUCCH includes but is not limited to the following manners:

Manner 1: If the UE supports reciprocity between an uplink beam and a downlink beam, that is, if there is a QCL relationship between a downlink beam #1 and an uplink beam #1, the UE selects $n_{CCE}=n_{CCE\ \#1}$ corresponding to the downlink beam #1; and then determines the resource location parameter of the PUCCH in a manner similar to the equation 1, $n_{PUCCH}^{(1,\tilde{p}_0)}=n_{CCE}+N_{PUCCH}^{(1)}$.

In this embodiment of this application, $n_{CCE}$ is also referred to as a resource location identifier.

For implementation of determining whether there is a QCL relationship between the downlink beam #1 and the uplink beam #1, refer to QCL related configuration manners in FIG. 2 to FIG. 12.

Manner 2: The UE selects a minimum value of $n_{CCE\ \#1}$, $n_{CCE\ \#2}$, that is, $n_{CCE}=\min\{n_{CCE\ \#1}, n_{CCE\ \#2}\}$; and then determines the resource location parameter of the PUCCH based on a basic formula similar to the equation 1, $n_{PUCCH}^{(1,\tilde{p}_0)}=n_{CCE}+N_{PUCCH}^{(1)}$.

Manner 3: The UE selects a maximum value of $n_{CCE\ \#1}$, $n_{CCE\ \#2}$, that is, $n_{CCE}=\max\{n_{CCE\ \#1}, n_{CCE\ \#2}\}$; and then determines the resource location parameter of the PUCCH based on a basic formula similar to the equation 1, $n_{PUCCH}^{(1,\tilde{p}_0)}=n_{CCE}+N_{PUCCH}^{(1)}$.

Manner 4: If the UE gives up monitoring another PDCCH provided that the UE detects one PDCCH, the UE uses $n_{CCE}$ corresponding to the detected PDCCH, and then determines the resource location parameter of the PUCCH based on a basic formula similar to the equation 1, $n_{PUCCH}^{(1,\tilde{p}_0)}=n_{CCE}+N_{PUCCH}^{(1)}$.

Manner 5: The UE separately calculates two values $n_{PUCCH\ \#1}^{(1,\tilde{p}_0)}$, $n_{PUCCH\ \#2}^{(1,\tilde{p}_0)}$ (for example, by using the equation 1), then calculates two time-frequency resource locations $\{n_{PRB\ \#1}(i), n_{PRB\ \#2}(i),\}$ (for example, by using the equation 2), and uses the two locations in subsequent PUCCH sending.

Step S106: The UE maps the PUCCH by using a time-frequency resource determined in step S104, and performs uplink transmission in a beam direction indicated in step S100.

Optionally, time for sending the PUCCH by the UE may be an $(n+4)^{th}$ subframe (in an LTE FDD scenario) or an $(n+m)^{th}$ subframe, where m may be related to a TDD frame configuration, that is, a specific value of m is configured for each type of TDD frame, and there is a corresponding value range of m when the UE sends the PUCCH in a subframe. Certainly, alternatively, m may be directly notified by the base station.

In the foregoing method, the UE can determine a time-frequency resource of the PUCCH and a beam for sending the time-frequency resource of the PUCCH, thereby avoiding an error during PUCCH resource selection by the UE.

Further, when N PDCCHs correspond to a same PDSCH, information fed back by the UE to the base station is one bit; or when N PDCCHs respectively correspond to different PDSCHs, information fed back by the UE to the base station is N bits. Feedback information of different lengths corresponds to different time-frequency resources. More time-frequency resources are occupied accordingly as a quantity of bits in the feedback information increases. To reduce time-frequency resource occupation, during implementation based on the foregoing method, the resource location parameter of the PUCCH may be determined in one of Manner 1 to Manner 4 when the information fed back by the UE is one bit; or the resource location parameter of the PUCCH may be determined in Manner 5 when the information fed back by the UE is more than one bit.

Figure 15:
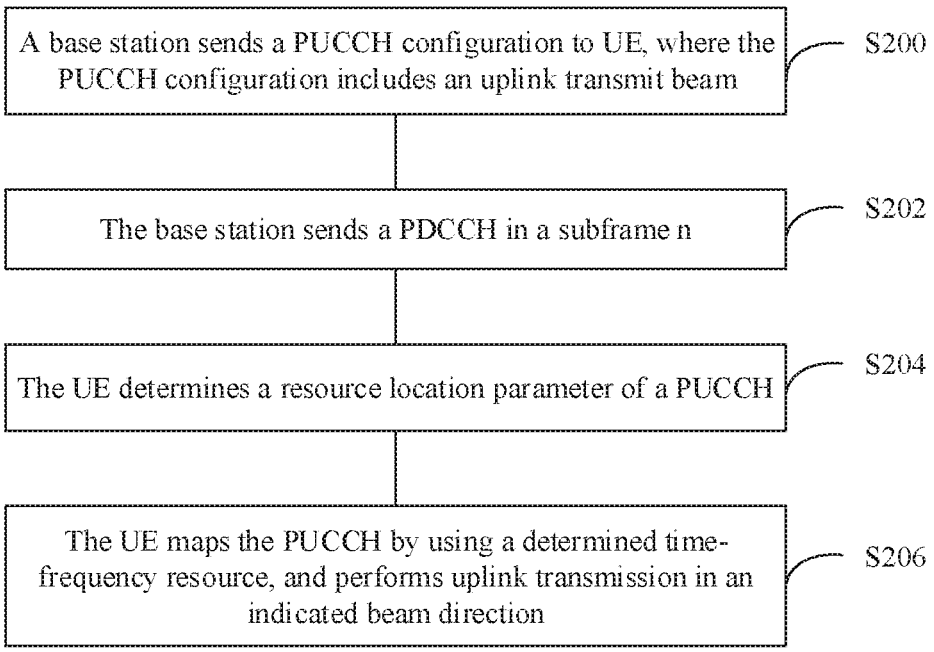
FIG. 15 is a schematic flowchart of another communication method for determining a resource location parameter of a PUCCH according to an embodiment of this application.

When there is one downlink PDCCH but a plurality of uplink PUCCHs are needed, an embodiment of this application provides a communication method, as shown in FIG. 15. To clearly describe the method shown in FIG. 15, the following gives description by using an example in which there is one downlink PDCCH, the first CCE number of the PDCCH is $n_{CCE}$, and PUCCH resources are $\{n_{PRB\ \#1}(i), n_{PRB\ \#2}(i),\}$.

The method includes the following steps.

Step S200: A base station sends a PUCCH configuration to UE, where the PUCCH configuration includes an uplink transmit beam.

Optionally, the uplink transmit beam may be an uplink beam #1 and an uplink beam #2.

Step S202: The base station sends one PDCCH in a subframe n.

Step S204: The UE determines $n_{CCE}$ and determines resource location parameters of a plurality of PUCCHs.

Optionally, a manner in which the UE determines a resource location parameter of a PUCCH includes but is not limited to the following manners:

Manner 1: If the UE supports reciprocity between an uplink beam and a downlink beam, that is, if there is a QCL relationship between a downlink beam #1 and an uplink beam #1, the UE selects a time-frequency resource corresponding to the uplink beam #1 as $n_{PUCCH}^{(1,\tilde{p}_0)} = n_{CCE} + N_{PUCCH}^{(1)}$ and selects a time-frequency resource corresponding to an uplink beam #2 as, $n_{PUCCH}^{(1,\tilde{p}_0)} = n_{CCE} + N_{PUCCH}^{(1)} + \text{offset}$ Optionally, the offset may be a function of {uplink beam #1, uplink beam #2)}, for example, may be a difference between the uplink beam #1 and the uplink beam #2. Alternatively, the offset may be notified by the base station.

For implementation of determining whether there is a QCL relationship between the downlink beam #1 and the uplink beam #1, refer to QCL related configuration manners in FIG. 2 to FIG. 12.

Manner 2: The $N_{PUCCH}^{(1)}$ is a beam-related value configured by using higher layer signaling, and a resource location parameter of a PUCCH is determined based on $n_{PUCCH}^{(1,\tilde{p}_0)} = n_{CCE} + N_{PUCCH}^{(1)}$.

For example, a plurality of $N_{PUCCH}^{(1)}$ are configured in step S200, and may be $N_{PUCCH\ \#1}^{(1)}$, $N_{PUCCH\ \#2}^{(1)}$.

Manner 3: The UE uses a time-frequency resource corresponding to a same $n_{PUCCH}^{(1,\tilde{p}_0)}$, that is $n_{PUCCH\ \#1}^{(1,\tilde{p}_0)} = n_{PUCCH\ \#2}^{(1,\tilde{p}_0)} = N_{CCE} + N_{PUCCH}^{(1)}$, and performs sending based on an indication in step S200 by using two beam directions.

Step S206: The UE maps the PUCCH by using a time-frequency resource determined in step S204, and performs uplink transmission in a beam direction indicated in step S200.

In the foregoing method, the UE can determine a time-frequency resource of the PUCCH and a beam for sending the time-frequency resource of the PUCCH, thereby avoiding an error during PUCCH resource selection by the UE.

When there are M downlink PDCCHs and N uplink PUCCHs, if there is a one-to-one correspondence between M and N, that is, M=N, a PUCCH resource may be determined for each PDCCH-PUCCH pair by using the foregoing equation 1 $n_{PUCCH}^{(1,\tilde{p}_0)} = n_{CCE} + N_{PUCCH}^{(1)}$.

If there is no one-to-one correspondence between M and N:

When M is greater than N, a group of downlink PDCCHs correspond to one PUCCH, and N groups of PDCCHs are in a one-to-one correspondence with N PUCCHs. For each group of PDCCHs and a corresponding PUCCH, a resource location parameter of the PUCCH may be determined by using the foregoing equation 1 $n_{PUCCH}^{(1,\tilde{p}_0)} = n_{CCE} + N_{PUCCH}^{(1)}$.

A PDCCH included in each group of PDCCHs is configured in advance by the base station. Optionally, the base station may group PDCCHs having same DCI into one group.

In each group of downlink PDCCHs, a time-frequency resource of a PUCCH may be determined with reference to an implementation in the embodiment shown in FIG. 14.

When M is less than N, one downlink PDCCH corresponds to one group of PUCCHs, and M PDCCHs have a one-to-one correspondence with M groups of PUCCHs. For each PDCCH and a corresponding group of PUCCHs, a resource location parameter of a PUCCH may be determined by using the foregoing equation 1 $n_{PUCCH}^{(1,\tilde{p}_0)} = n_{CCE} + N_{PUCCH}^{(1)}$.

In each group, a time-frequency resource of a PUCCH may be determined with reference to an implementation in the embodiment shown in FIG. 15. It should be noted that, a resource location of a PUCCH in this embodiment of this application may also be referred to as a time-frequency resource of a PUCCH, or a PUCCH resource.

In an optional implementation, alternatively, the base station may directly configure a resource location parameter of a PUCCH.

The foregoing mainly describes the solutions provided in the embodiments of this application from the perspective of interaction between network elements. It may be understood that, to implement the foregoing functions, each network element, for example, the base station or the terminal device, includes a corresponding hardware structure and/or a software module for performing each function. A person of ordinary skill in the art should easily be aware that, in combination with example methods and steps described in the embodiments disclosed in this specification, this application can be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

Function module division may be performed on the base station or the terminal device according to the foregoing method examples in the embodiments of this application. For example, function modules may be divided based on corresponding functions, or two or more functions may be integrated into a processing module. The integrated module may be implemented in a form of hardware, or may be implemented in a form of a software function module. It should be noted that the module division in the embodiments of this application is an example, and is merely logical function division, and there may be another division manner in actual implementation. The following gives description by using an example in which function modules are divided based on corresponding functions.

Figure 16:
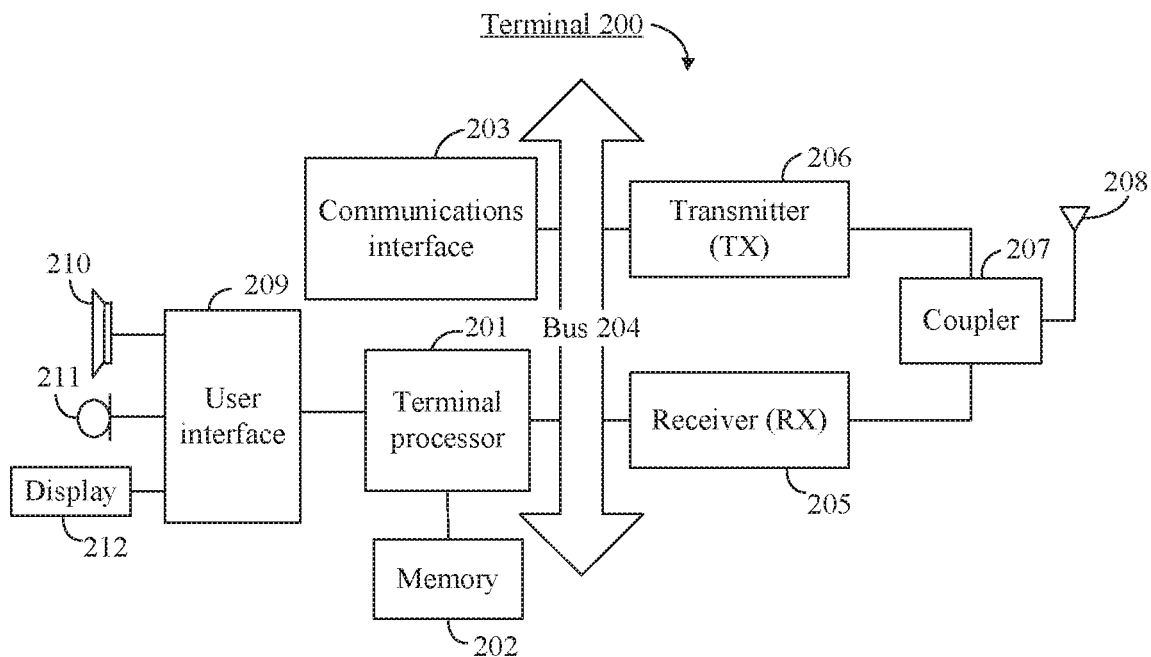
FIG. 16 is a schematic structural diagram of a terminal device according to an embodiment of this application.

FIG. 16 shows a terminal 200 according to some embodiments of this application. As shown in FIG. 16, the terminal 200 may include: one or more terminal processors 201, a memory 202, a communications interface 203, a receiver 205, a transmitter 206, a coupler 207, an antenna 208, a user interface 209, and an input/output module (including an audio input/output module 210, a key input module 211, a display 212, and the like). These components may be connected by using a bus 204 or in another manner. FIG. 16 uses an example in which the connection is made by using a bus.

The communications interface 203 may be configured for the terminal 200 to communicate with another communications device, for example, a network device. Specifically, the network device may be a network device 300 shown in FIG. 17. Specifically, the communications interface 203 may be a long term evolution (LTE) (4G) communications interface, or may be a 5G communications interface or a future new radio communications interface. The communications interface 203 is not limited to a wireless communications interface. Alternatively, the terminal 200 may be equipped with a wired communications interface 203, for example, a local area network (LAN) interface.

The transmitter 206 may be configured to perform transmit processing, for example, signal modulation, on a signal output by the terminal processor 201. The receiver 205 may be configured to perform reception processing, for example, signal demodulation, on a mobile communication signal received by the antenna 208. In some embodiments of this application, the transmitter 206 and the receiver 205 may be considered as a wireless modem. In the terminal 200, there may be one or more transmitters 206 and one or more receivers 205. The antenna 208 may be configured to convert electromagnetic energy in a transmission line into an electromagnetic wave in free space, or convert an electromagnetic wave in free space into electromagnetic energy in a transmission line. The coupler 207 is configured to split a mobile communication signal received by the antenna 208 into a plurality of channels to be allocated to a plurality of receivers 205.

The terminal 200 may further include another communications component, such as a GPS module, a Bluetooth (Bluetooth) module, or a wireless fidelity (Wi-Fi) module, in addition to the transmitter 206 and the receiver 205 shown in FIG. 16. The terminal 200 may further support another wireless communication signal, for example, a satellite signal or a short-wave signal, in addition to the foregoing-mentioned wireless communication signal. Alternatively, the terminal 200 may be equipped with a wired network interface (for example, a LAN interface) to support wired communication, in addition to wireless communication.

The input/output module may be configured to implement interaction between the terminal 200 and a user or an external environment, and may mainly include the audio input/output module 210, the key input module 211, the display 212, and the like. Specifically, the input/output module may further include: a camera, a touchscreen, a sensor, and the like. The input/output module communicates with the terminal process 201 through the user interface 209.

The memory 202 is coupled to the terminal processor 201, and is configured to store various software programs and/or a plurality of sets of instructions. Specifically, the memory 202 may include a high-speed random access memory, and may further include a non-volatile memory, for example, one or more disk storage devices, a flash memory, or another non-volatile solid state storage device. The memory 202 may store an operating system (referred to as a system for short below), for example, an embedded operating system such as Android, iOS, Windows, or Linux. The memory 202 may further store a network communications program. The network communications program may be configured to communicate with one or more additional devices, one or more terminal devices, and one or more network devices. The memory 202 may further store an interface program. The interface program may vividly display content of an application program by using a graphical operation interface; and receive, by using an input control such as a menu, a dialog box, or a button, a control operation that is performed by a user on the application program.

In some embodiments of this application, the memory 202 may be configured to store a program, on a side of the terminal 200, for implementing a signal transmission method provided in one or more embodiments of this application.

The terminal processor 201 may be configured to read and execute a computer-readable instruction. Specifically, the terminal processor 201 may be configured to: invoke the program stored in the memory 202, for example, the program, on the side of the terminal 200, for implementing the signal transmission method provided in the one or more embodiments of this application, and execute an instruction included in this program.

It may be understood that, the terminal 200 may be the terminal 103 in the wireless communications system 100 shown in FIG. 1, and may be implemented as a mobile device, a mobile station (mobile station), a mobile unit (mobile unit), a radio unit, a remote unit, a user proxy, a mobile client, or the like.

The terminal processor 201 is usually a control center of a terminal device, and is usually referred to as a processing unit, configured to control the terminal device in performing steps performed by the terminal device in FIG. 2, FIG. 7, FIG. 11. FIG. 14, and FIG. 15. For example, the receiver 205 may perform a step of receiving, by the UE, QCL configuration information with respect to an average gain that is sent by the base station in FIG. 2, and the terminal processor 201 may perform a step in FIG. 2, such as a step of obtaining a measurement quantity related to an average gain. Alternatively, the receiver 205 may perform a step of receiving, by the UE, QCL configuration information related to a control channel that is sent by the base station in FIG. 7, and the terminal processor 201 may perform a step in FIG. 7, such as a step of obtaining a measurement quantity about a spatial parameter, an average gain, delay spread, Doppler spread, Doppler frequency shift, or an average delay with respect to a control channel. Alternatively, the receiver 205 may perform a step of receiving, by the UE, QCL configuration information related to a data channel that is sent by the base station in FIG. 11, and the terminal processor 201 may perform a step in FIG. 11, such as a step of obtaining a data channel related measurement quantity about a spatial parameter, an average gain, delay spread, Doppler spread, Doppler frequency shift, or an average delay. In addition, the terminal processor 201 may perform a step in FIG. 14 and FIG. 15, such as a step of determining a location of a PUCCH resource in FIG. 14 and FIG. 15. For details, refer to descriptions in the foregoing UE related sections. Details are not described again.

It should be noted that, the terminal 200 shown in FIG. 16 is merely an implementation of an embodiment of this application. During actual application, the terminal 200 may further include more or fewer components, and this is not limited herein.

Figure 17:
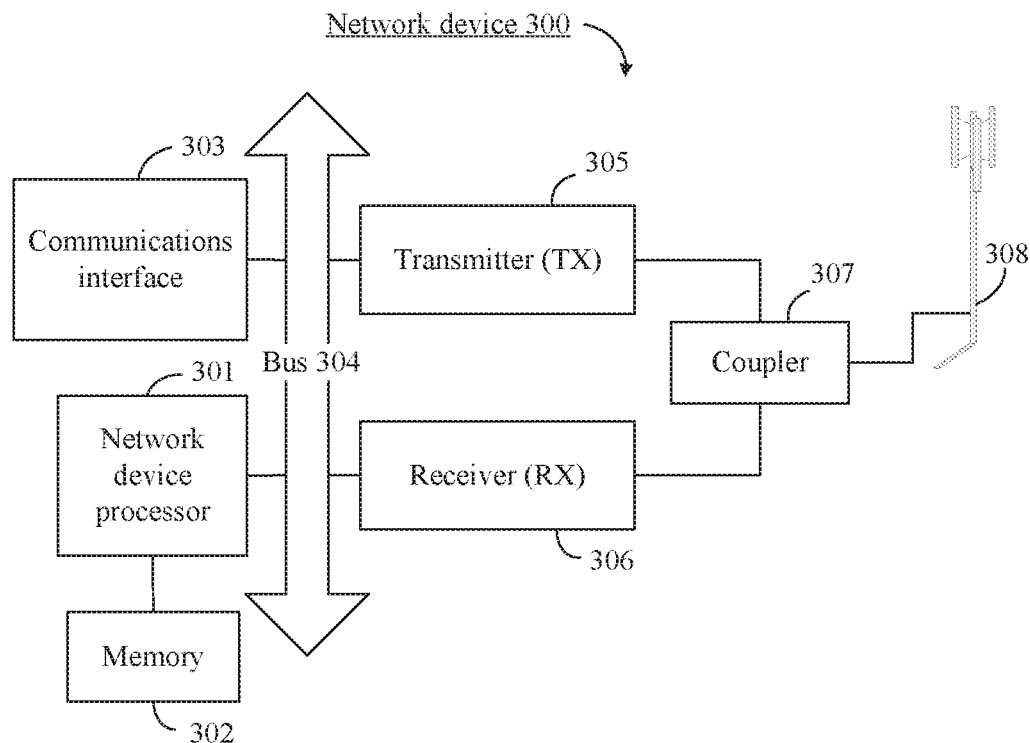
FIG. 17 is a schematic structural diagram of a base station according to an embodiment of this application.

FIG. 17 shows a network device 300 according to some embodiments of this application. As shown in FIG. 17, the network device 300 may include: one or more network device processors 301, a memory 302, a communications interface 303, a transmitter 305, a receiver 306, a coupler 307, and an antenna 308. These components may be connected by using a bus 304 or in another manner. FIG. 17 uses an example in which the connection is made by using a bus.

The communications interface 303 may be configured for the network device 300 to communicate with another communications device, for example, a terminal device or another network device. Specifically, the terminal device may be the terminal 200 shown in FIG. 16. Specifically, the communications interface 303 may be a long term evolution (LTE) (4G) communications interface, or may be a 5G communications interface or a future new radio communications interface. The communications interface 303 is not limited to a wireless communications interface. Alternatively, the network device 300 may be equipped with a wired communications interface 303 to support wired communication. For example, a backhaul link between one network device 300) and another network device 300 may be a wired communication connection.

The transmitter 305 may be configured to perform transmit processing, for example, signal modulation, on a signal output by the network device processor 301. The receiver 306 may be configured to perform reception processing, for example, signal demodulation, on a mobile communication signal received by the antenna 308. In some embodiments of this application, the transmitter 305 and the receiver 306 may be considered as a wireless modem. In the network device 300, there may be one or more transmitters 305 and one or more receivers 306. The antenna 308 may be configured to convert electromagnetic energy in a transmission line into an electromagnetic wave in free space, or convert an electromagnetic wave in free space into electromagnetic energy in a transmission line. The coupler 307 may be configured to split a mobile communication signal into a plurality of channels to be allocated to a plurality of receivers 306.

The memory 302 is coupled to the network device processor 301, and is configured to store various software programs and/or a plurality of sets of instructions. Specifically, the memory 302 may include a high-speed random access memory, and may further include a non-volatile memory, for example, one or more disk storage devices, a flash memory, or another non-volatile solid state storage device. The memory 302 may store an operating system (referred to as a system for short below), for example, an embedded operating system such as uCOS, VxWorks, or RTLinux. The memory 302 may further store a network communications program. The network communications program may be configured to communicate with one or more additional devices, one or more terminal devices, and one or more network devices.

The network device processor 301 may be configured to perform radio channel management, implement establishment and removal of a call or a communications link, and provide a terminal in a current control area with cell handover control and the like. Specifically, the network device processor 301 may include: an administration module/communication module (AM/CM) (a center configured to perform voice channel switching and information exchange), a basic module (BM) (configured to perform call processing, signaling processing, radio resource management, radio link management, and circuit maintenance functions), a transcoder and submultiplexer (TCSM) unit (configured to perform multiplexing, demultiplexing, and transcoding functions), or the like.

In this embodiment of this application, the network device processor 301 may be configured to read and execute a computer-readable instruction. Specifically, the network device processor 301 may be configured to invoke a program stored in the memory 302, for example, a program, on a side of the network device 300, for implementing a signal transmission method provided in one or more embodiments of this application, and execute an instruction included in this program.

It may be understood that, the network device 300 may be the network device 101 in the wireless communications system 100 shown in FIG. 1, and may be implemented as a base transceiver station, a wireless transceiver, a basic service set (BSS), an extended service set (ESS), a NodeB, an eNodeB, an access point or a TRP, or the like.

The network device processor 301 is usually a control center of a base station, and is usually referred to as a processing unit, configured to control the base station in performing steps performed by the base station in FIG. 2, FIG. 7, FIG. 11, FIG. 14, and FIG. 15. For example, the network device processor 301 may perform a step of determining QCL with respect to an average gain in FIG. 2, and the transmitter 305 may perform a step of sending, by the base station, QCL configuration information with respect to an average gain to the UE in FIG. 2. Alternatively, the network device processor 301 may perform a step of determining a measurement quantity about a spatial parameter, an average gain, delay spread. Doppler spread. Doppler frequency shift, or an average delay with respect to a control channel in FIG. 7, and the transmitter 305 may perform a step of sending, by the base station, QCL configuration information related to a control channel to the UE in FIG. 7. Alternatively, the network device processor 301 may perform a step of determining a measurement quantity about a spatial parameter, an average gain, delay spread, Doppler spread, Doppler frequency shift, or an average delay with respect to a data channel in FIG. 11, and the transmitter 305 may perform a step of sending, by the base station, QCL configuration information related to a data channel to the UE in FIG. 11. In addition, the network device processor 301 may perform a step of establishing a correspondence between beam information and a downlink signal identifier or establishing a correspondence between beam information and an uplink signal identifier, and the transmitter may perform a step of sending a related correspondence to the UE. For details, refer to descriptions in the foregoing base station related sections. Details are not described again.

It should be noted that, the network device 300 shown in FIG. 17 is merely an implementation of an embodiment of this application. During actual application, the network device 300 may further include more or fewer components, and this is not limited herein.

A person of ordinary skill in the art may be aware that, in combination with the examples described in the embodiments disclosed in this specification, units and algorithm steps may be implemented by electronic hardware, computer software, or a combination thereof. To clearly describe interchangeability between the hardware and the software, the foregoing has generally described compositions and steps of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and there may be another division manner in actual implementation. For example, a plurality of units or components may be combined or integrated into another system, or some features may be ignored or not performed. In addition, the shown or discussed mutual couplings or direct couplings or communication connections may be implemented through some interfaces, indirect couplings or communication connections between the apparatuses or units, or electrical connections, mechanical connections, or connections in other forms.

The units described as separate parts may or may not be physically separate, and parts displayed as units may or may not be physical units, that is, may be located in one position, or may be distributed on a plurality of network units. Some or all of the units may be selected according to actual requirements to achieve the objectives of the solutions of the embodiments of this application.

In addition, function units in the embodiments of this application may be integrated into one processing unit, or each of the units may exist alone physically, or two or more units are integrated into one unit. The integrated unit may be implemented in a form of hardware, or may be implemented in a form of a software function unit.

When the integrated unit is implemented in the form of a software function unit and sold or used as an independent product, the integrated unit may be stored in a computer-readable storage medium. Based on such an understanding, the technical solutions of this application essentially, or the part contributing to the prior art, or all or some of the technical solutions may be implemented in a form of a software product. The software product is stored in a storage medium and includes several instructions for instructing a computer device (which may be a personal computer, a server, a network device, or the like) to perform all or some of the steps of the methods described in the embodiments of this application. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any modification or replacement readily figured out by a person skilled in the art within the technical scope disclosed in this application shall fall within the protection scope of this application. Therefore, the protection scope of this application shall be subject to the protection scope of the claims.

What is claimed is:

1. A communication method, wherein the method comprises:
    receiving configuration information sent by a base station, wherein the configuration information comprises information about a first signal and quasi-co-location relationship information, and the quasi-co-location relationship information indicates that there is a quasi-co-location relationship between a port for sending the first signal and a port for sending a second signal, and wherein the information about the first signal comprises beam information about a beam for receiving the first signal, and wherein the quasi-co-location relationship information indicates that the quasi-co-location relationship is between the port that sends a synchronization signal block, and the port that sends a channel state information reference signal (CSI-RS) signal, and wherein the configuration information further comprises a measurement time window for averaging measurement values of the second signal;
    determining, based on the beam information, that a spatial quasi-co-location relationship exists between the port for sending the first signal and the port for sending the second signal; and
    obtaining a measurement quantity of the first signal based on a measurement quantity of the second signal and the quasi-co-location relationship information and the determination that the spatial quasi-co-location relationship exists between the port for sending the first signal and the port for sending the second signal and the measurement time window in the configuration information.

2. The method according to claim 1, wherein:
    the measurement quantity of the first signal or the measurement quantity of the second signal comprises at least one of the following information: a spatial parameter, an average gain, delay spread, Doppler spread, Doppler frequency shift, or an average delay.

3. The method according to claim 1, wherein:
    the quasi-co-location relationship information comprises information about a quasi-co-location relationship that is with respect to an average gain and that is between the port for sending the first signal and the port for sending the second signal; and
    the obtaining a measurement quantity of the first signal based on a measurement quantity of the second signal and the quasi-co-location relationship information comprises:
    obtaining an average gain of the first signal based on an average gain of the second signal and the quasi-co-location relationship.

4. The method according to claim 3, wherein the obtaining an average gain of the first signal comprises:
    using a value of the average gain of the second signal as a value of the average gain of the first signal; or
    separately obtaining an average gain of the first signal and an average gain of the second signal, and using an average gain obtained after averaging or federated filtering of the average gain of the first signal and the average gain of the second signal as the average gain of the first signal.

5. The method according to claim 1, wherein the quasi-co-location relationship information comprises information about a quasi-co-location relationship with respect to delay spread, Doppler spread, Doppler frequency shift, or an average delay, and the method further comprises:
    obtaining delay spread, Doppler spread, Doppler frequency shift, or an average delay of the first signal based on delay spread, Doppler spread, Doppler frequency shift, or an average delay of the second signal and the quasi-co-location relationship that is with respect to an average gain and that is between the port for sending the first signal and the port for sending the second signal.

6. The method according to claim 1, wherein the method further comprises:
    receiving a correspondence that is between beam information and a downlink signal identifier and that is sent by the base station; and
    establishing, based on the correspondence, a correspondence between the beam information, the downlink signal identifier, and a receive beam or a spatial parameter.

7. The method according to claim 6, wherein the beam information of the first signal is information represented by a beam identifier, and the method further comprises:
when the configuration information is received by using signaling that controls downlink transmission, determining, based on a pre-established correspondence between a beam identifier and a downlink signal identifier, that a receive beam corresponding to a downlink signal identifier corresponding to a received beam identifier is the receive beam for receiving the first signal.

8. A terminal device, comprising a receiver, at least one processor, and one or more memories coupled to the at least one processor and storing programming instructions for execution by the at least one processor to:
receive, through the receiver, configuration information sent by a base station, wherein the configuration information comprises information about a first signal and quasi-co-location relationship information, and the quasi-co-location relationship information indicates that there is a quasi-co-location relationship between a port for sending the first signal and a port for sending a second signal, and wherein the information about the first signal comprises beam information about a beam for receiving the first signal, and wherein the quasi-co-location relationship information indicates that the quasi-co-location relationship is between the port that sends a synchronization signal block, and the port that sends a channel state information reference signal (CSI-RS) signal, and wherein the configuration information further comprises a measurement time window for averaging measurement values of the second signal;
determine, based on the beam information, that a spatial quasi-co-location relationship exists between the port for sending the first signal and the port for sending the second signal; and
obtain a measurement quantity of the first signal based on a measurement quantity of the second signal and the quasi-co-location relationship information and the determination that the spatial quasi-co-location relationship exists between the port for sending the first signal and the port for sending the second signal and the measurement time window in the configuration information.

9. The terminal device according to claim 8, wherein:
the measurement quantity of the first signal or the measurement quantity of the second signal comprises at least one of the following information: a spatial parameter, an average gain, delay spread, Doppler spread, Doppler frequency shift, or an average delay.

10. The terminal device according to claim 8, wherein:
the quasi-co-location relationship information comprises information about a quasi-co-location relationship that is with respect to an average gain and that is between the port for sending the first signal and the port for sending the second signal; and
the one or more memories store programming instructions for execution by the at least one processor to obtain an average gain of the first signal based on an average gain of the second signal and the quasi-co-location relationship.

11. The terminal device according to claim 10, wherein the obtaining an average gain of the first signal comprises:
using a value of the average gain of the second signal as a value of the average gain of the first signal; or
separately obtaining an average gain of the first signal and an average gain of the second signal, and using an average gain obtained after averaging or federated filtering of the average gain of the first signal and the average gain of the second signal as the average gain of the first signal.

12. The terminal device according to claim 8, wherein the quasi-co-location relationship information comprises information about a quasi-co-location relationship with respect to delay spread, Doppler spread, Doppler frequency shift, or an average delay; and the one or more memories store programming instructions for execution by the at least one processor to obtain delay spread, Doppler spread, Doppler frequency shift, or an average delay of the first signal based on delay spread, Doppler spread, Doppler frequency shift, or an average delay of the second signal and the quasi-co-location relationship that is with respect to an average gain and that is between the port for sending the first signal and the port for sending the second signal.

13. The terminal device according to claim 8, wherein the one or more memories store programming instructions for execution by the at least one processor to:
receive, through the receiver, a correspondence that is between beam information and a downlink signal identifier and that is sent by the base station; and
establish, based on the correspondence, a correspondence between the beam information, the downlink signal identifier, and a receive beam or a spatial parameter.

14. The terminal device according to claim 13, wherein the beam information of the first signal is information represented by a beam identifier, and the one or more memories store programming instructions for execution by the at least one processor to: when the configuration information is received by using signaling that controls downlink transmission, determine, based on a pre-established correspondence between a beam identifier and a downlink signal identifier, that a receive beam corresponding to a downlink signal identifier corresponding to a received beam identifier is the receive beam for receiving the first signal.

15. A non-transitory computer-readable medium storing computer instructions, that when executed by one or more processors, cause a computer to perform operations comprising:
receiving configuration information sent by a base station, wherein the configuration information comprises information about a first signal and quasi-co-location relationship information, and the quasi-co-location relationship information indicates that there is a quasi-co-location relationship between a port for sending the first signal and a port for sending a second signal, and wherein the information about the first signal comprises beam information about a beam for receiving the first signal, and wherein the quasi-co-location relationship information indicates that the quasi-co-location relationship is between the port that sends a synchronization signal block, and the port that sends a channel state information reference signal (CSI-RS) signal, and wherein the configuration information further comprises a measurement time window for averaging measurement values of the second signal;
determining, based on the beam information, that a spatial quasi-co-location relationship exists between the port for sending the first signal and the port for sending the second signal; and
obtaining a measurement quantity of the first signal based on a measurement quantity of the second signal and the quasi-co-location relationship information and the determination that the spatial quasi-co-location relationship exists between the port for sending the first signal and the port for sending the second signal, and the measurement time window in the configuration information.

\* \* \* \* \*

UNITED STATES PATENT AND TRADEMARK OFFICE
CERTIFICATE OF CORRECTION

| | |
|---|---|
| PATENT NO. | : 11,723,022 B2 |
| APPLICATION NO. | : 16/786477 |
| DATED | : August 8, 2023 |
| INVENTOR(S) | : Peng Guan et al. |

It is certified that error appears in the above-identified patent and that said Letters Patent is hereby corrected as shown below:

On the Title Page

In Column 2 (Other Publications), In Line 2, Delete "Network" and insert -- Network; --.

Signed and Sealed this
Twelfth Day of March, 2024

Katherine Kelly Vidal
*Director of the United States Patent and Trademark Office*